US012473522B2

(12) United States Patent
Zamarayeva et al.

(10) Patent No.: US 12,473,522 B2
(45) Date of Patent: Nov. 18, 2025

(54) METHODS AND SYSTEMS FOR CELL LABELING AND IMAGING

(71) Applicant: CELLFE, INC., Alameda, CA (US)

(72) Inventors: Alla Zamarayeva, Berkeley, CA (US); Alexander Alexeev, Atlanta, GA (US); Todd Sulchek, Atlanta, GA (US); Sewoon Han, Albany, CA (US); Miguel Calero-Garcia, San Francisco, CA (US); Ian Sicher, Alameda, CA (US)

(73) Assignee: CellFE, Inc., Alameda, CA (US)

( * ) Notice: Subject to any disclaimer, the term of this patent is extended or adjusted under 35 U.S.C. 154(b) by 841 days.

(21) Appl. No.: 17/618,823

(22) PCT Filed: Jun. 11, 2020

(86) PCT No.: PCT/US2020/037330
§ 371 (c)(1),
(2) Date: Dec. 13, 2021

(87) PCT Pub. No.: WO2020/252215
PCT Pub. Date: Dec. 17, 2020

(65) Prior Publication Data
US 2022/0298461 A1 Sep. 22, 2022

Related U.S. Application Data

(60) Provisional application No. 62/860,641, filed on Jun. 12, 2019.

(51) Int. Cl.
*C12M 3/06* (2006.01)
*A61K 49/00* (2006.01)
(Continued)

(52) U.S. Cl.
CPC ......... *C12M 23/16* (2013.01); *A61K 49/0032* (2013.01); *A61K 49/0043* (2013.01);
(Continued)

(58) Field of Classification Search
CPC ............ A61K 49/0093; A61K 49/0043; A61K 49/0032; A61K 49/1863; C12M 35/04; C12M 23/16; A61P 35/00; B82Y 30/00
See application file for complete search history.

(56) References Cited

U.S. PATENT DOCUMENTS 6,544,423 B1   4/2003   Baurmeister et al.
8,356,714 B2   1/2013   Sulchek et al.
(Continued)

FOREIGN PATENT DOCUMENTS

WO   2016183482 A1   11/2016
WO   2017083391 A1    5/2017
(Continued)

OTHER PUBLICATIONS

U.S. Appl. No. 17/611,454, Non Final Office Action mailed May 1, 2024, 13 pgs.
(Continued)

*Primary Examiner* — Shogo Sasaki
(74) *Attorney, Agent, or Firm* — Polygon IP, LLP

(57) ABSTRACT

The present disclosure provides methods and systems for cell processing, including delivery of imaging agents into cells. The methods and systems may comprise the use of a microfluidic device. The microfluidic device may comprise a channel comprising a compressive element. The compressive element may be configured to reduce a volume of the cell and facilitate the formation of one or more transient pores in a cell membrane of the cell. The one or more pores may permit one or more imaging agents to enter the cell. Also provided are modified cells produced using the disclosed methods and systems and methods of imaging the modified cells in a subject.

20 Claims, 21 Drawing Sheets

(51) Int. Cl.
  *A61K 49/18*    (2006.01)
  *A61P 35/00*    (2006.01)
  *C12M 1/42*     (2006.01)
  *B82Y 30/00*    (2011.01)

(52) U.S. Cl.
  CPC ...... *A61K 49/0093* (2013.01); *A61K 49/1863* (2013.01); *A61P 35/00* (2018.01); *C12M 35/04* (2013.01); *B82Y 30/00* (2013.01)

(56) References Cited

U.S. PATENT DOCUMENTS

| | | | |
|---|---|---|---|
| 10,717,084 | B2 | 7/2020 | Sulchek et al. |
| 11,198,127 | B2 | 12/2021 | Sulchek et al. |
| 11,268,892 | B2 | 3/2022 | Sulchek et al. |
| 2003/0049833 | A1 | 3/2003 | Chen et al. |
| 2007/0072290 | A1 | 3/2007 | Hvichia |
| 2011/0081674 | A1 | 4/2011 | Han et al. |
| 2014/0227777 | A1 | 8/2014 | Choi et al. |
| 2014/0248210 | A1 | 9/2014 | Bradbury et al. |
| 2014/0273229 | A1 | 9/2014 | Meacham et al. |
| 2014/0287509 | A1 | 9/2014 | Sharei et al. |
| 2015/0132742 | A1 | 5/2015 | Thuo et al. |
| 2016/0193605 | A1 | 7/2016 | Sharei et al. |
| 2016/0272961 | A1 | 9/2016 | Lee |
| 2017/0233692 | A1 | 8/2017 | Pawell et al. |
| 2017/0319843 | A1 | 11/2017 | Beebe et al. |
| 2018/0003696 | A1 | 1/2018 | Sharei et al. |
| 2018/0016539 | A1 | 1/2018 | Ding et al. |
| 2018/0142198 | A1 | 5/2018 | Sharei et al. |
| 2018/0155669 | A1 | 6/2018 | Pawell |
| 2018/0201889 | A1 | 7/2018 | Sharei et al. |
| 2018/0245089 | A1 | 8/2018 | Sharei et al. |
| 2018/0327706 | A1 | 11/2018 | Qin et al. |
| 2019/0017072 | A1 | 1/2019 | Ditommaso et al. |
| 2019/0022258 | A1 | 1/2019 | Wei et al. |
| 2019/0111082 | A1 | 4/2019 | Gilbert et al. |
| 2019/0177677 | A1 | 6/2019 | Jonas et al. |
| 2019/0275520 | A1 | 9/2019 | Stewart et al. |
| 2019/0322976 | A1 | 10/2019 | Williams et al. |
| 2019/0382796 | A1 | 12/2019 | Gilbert et al. |
| 2020/0172845 | A1 | 6/2020 | Baker et al. |
| 2020/0316604 | A1 | 10/2020 | Dadgar |
| 2020/0332243 | A1 | 10/2020 | Dadgar et al. |
| 2021/0292700 | A1 | 9/2021 | Han et al. |
| 2021/0331172 | A1 | 10/2021 | Ito et al. |
| 2021/0388390 | A1 | 12/2021 | Bernstein et al. |
| 2022/0105166 | A1 | 4/2022 | Sharei et al. |
| 2022/0109113 | A1 | 4/2022 | Li et al. |
| 2022/0168739 | A1* | 6/2022 | Ho .................. C12M 35/00 |
| 2022/0204908 | A1 | 6/2022 | Han et al. |
| 2022/0213422 | A1 | 7/2022 | Zamarayeva et al. |
| 2022/0298461 | A1 | 9/2022 | Zamarayeva et al. |

FOREIGN PATENT DOCUMENTS

| | | |
|---|---|---|
| WO | 2018089497 A1 | 5/2018 |
| WO | 2020026047 A1 | 2/2020 |
| WO | 2020232418 A1 | 11/2020 |
| WO | 2020252215 A1 | 12/2020 |

OTHER PUBLICATIONS

Barber, "A Technic for the Inoculation of Bacteria and Other Substances into Living Cells" The Journal of Infectious Diseases, Apr. 12, 1911, vol. 8, No. 3 (Apr. 12, 1911), pp. 348-360.

Deng et al., "Intracellular Delivery of Nanomaterials via an Inertial Microfluidic Cell Hydroporator" Nano Lett. 2018, 18, 4, 2705-2710.

Di Carlo, "Enhanced Velocity Gradients within Microfluidics for Cellular Manipulation" In: Baba, Y., Shoji, S., van den Berg, A. (eds) Micro Total Analysis Systems 2002. Springer, Dordrecht. https://doi.org/10.1007/978-94-010-0504-3_66.

Ding et al. "High-throughput Nuclear Delivery and Rapid Expression of DNA via Mechanical and Electrical Cell-Membrane Disruption" Nat Biomed Eng. 2017; 1: 0039.

Hallow et al., "Shear-induced intracellular loading of cells with molecules by controlled microfluidics" Biotechnol Bioeng. Mar. 1, 2008; 99(4): 846-854. doi: 10.1002/bit.21651.

Han et al., "CRISPR-Cas9 delivery to hard-to-transfect cells via membrane deformation" Science Advances Aug. 14, 2015.

International Application Serial No. PCT/US2020/033298, Search Report and Written Opinion mailed Sep. 10, 2020.

International Application Serial No. PCT/US2020/037330, Search Report and Written Opinion mailed Jul. 23, 2020.

Jarrell et al., "Intracellular delivery of mRNA to human primary T cells with microfluidic vortex shedding" Sci Rep 9, 3214 (2019).

Kang et al., "Intracellular Nanomaterial Delivery via Spiral Hydroporation" (ACS Nano 2020, 14, 3048-3058).

Liu et al., "Cell mechanical and physiological behavior in the regime of rapid mechanical compressions that lead to volume change." Small 16, 1903857-11, 2020.

Liu et al., "Microfluidic generation of transient cell volume exchange for convectively driven intracellular delivery of large macromolecules", Materials Today 21, 703-712, 2018.

Schmiderer et al., "Efficient and nontoxic biomolecule delivery to primary human hematopoietic stem cells using nanostraws" PNAS Sep. 1, 2020 117 (35) 21267-21273.

Sharei et al., "A vector-free microfluidic platform for intracellular delivery" Proc Natl Acad Sci U S A. Feb. 5, 2013; 110(6): 2082-2087.

Williams, A.R. et al., "Filtroporation: A Simple, Reliable Technique for Transfection and Macromolecular Loading of Cells in Suspension," Biotechnology and Bioengineering, vol. 65, No. 3, Nov. 5, 1999.

U.S. Appl. No. 17/611,454, Final Office Action mailed Aug. 8, 2024, 10 pgs.

DiCarlo et al., "Reagentless mechanical cell lysis by nanoscale barbs in microchannels for sample preparation" Lab on a Chip 3(4):287-91; Aug. 28, 2023.

U.S. Appl. No. 17/611,454, Non Final Office Action mailed Jan. 31, 2025, 11 pgs.

* cited by examiner

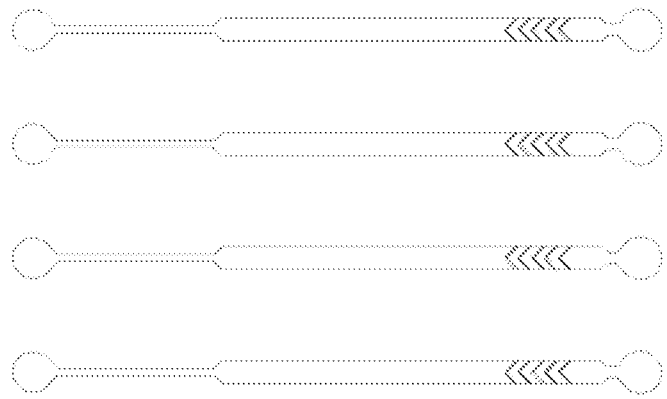
FIG. 1C
1x10E+8 cells/hr  
2x10E+8 cells/hr  
4x10E+8 cells/hr  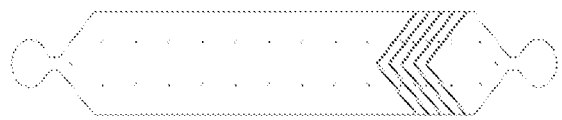
8x10E+8 cells/hr  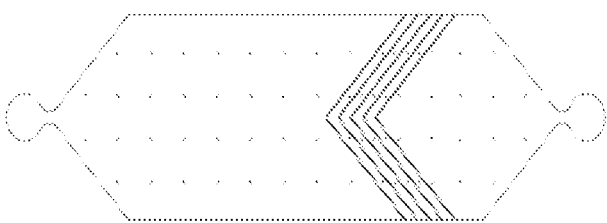
FIG. 1D

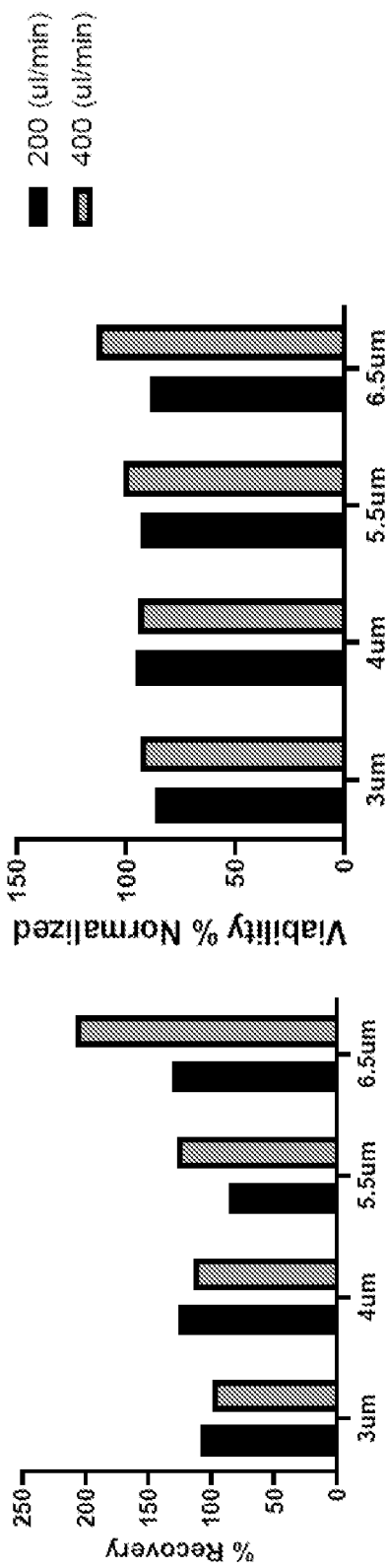
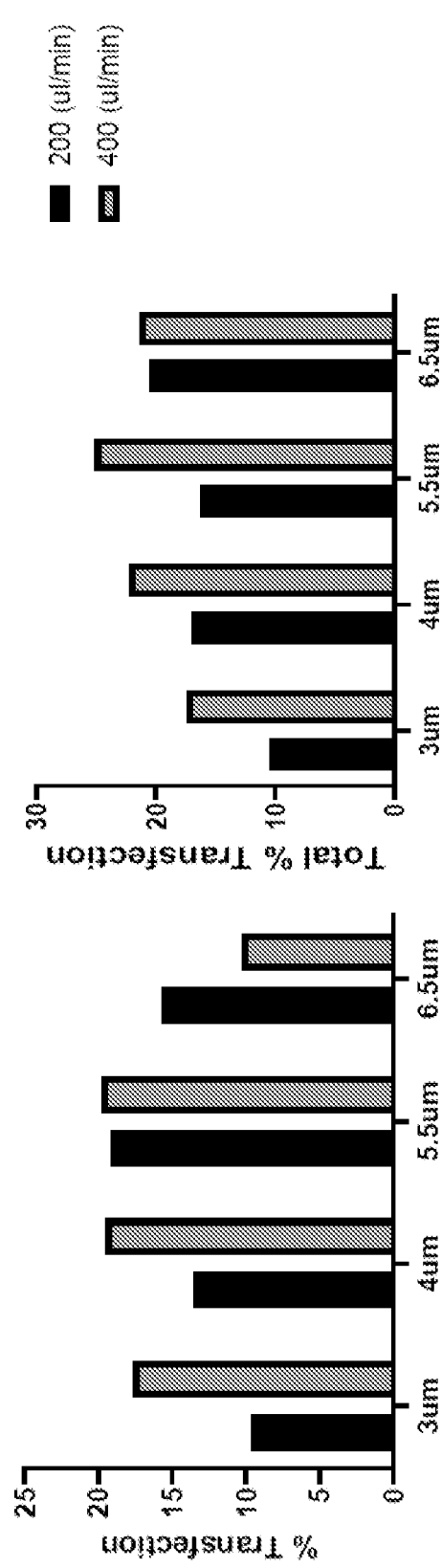
FIG. 12A
FIG. 12B
FIG. 12C
FIG. 12D

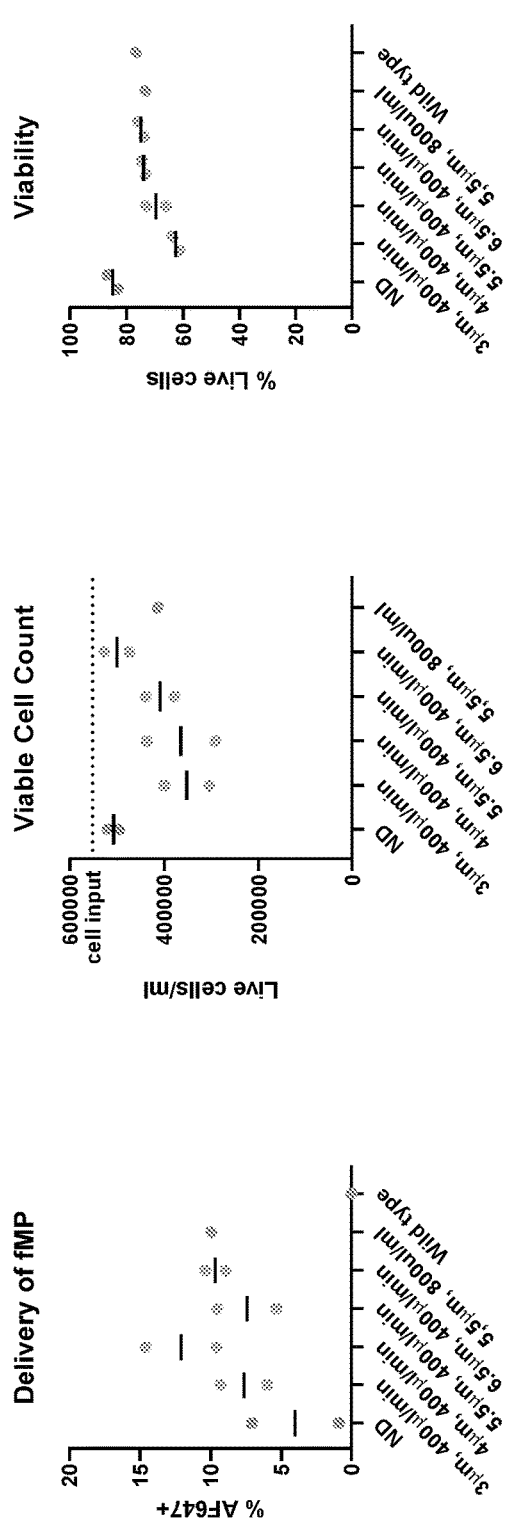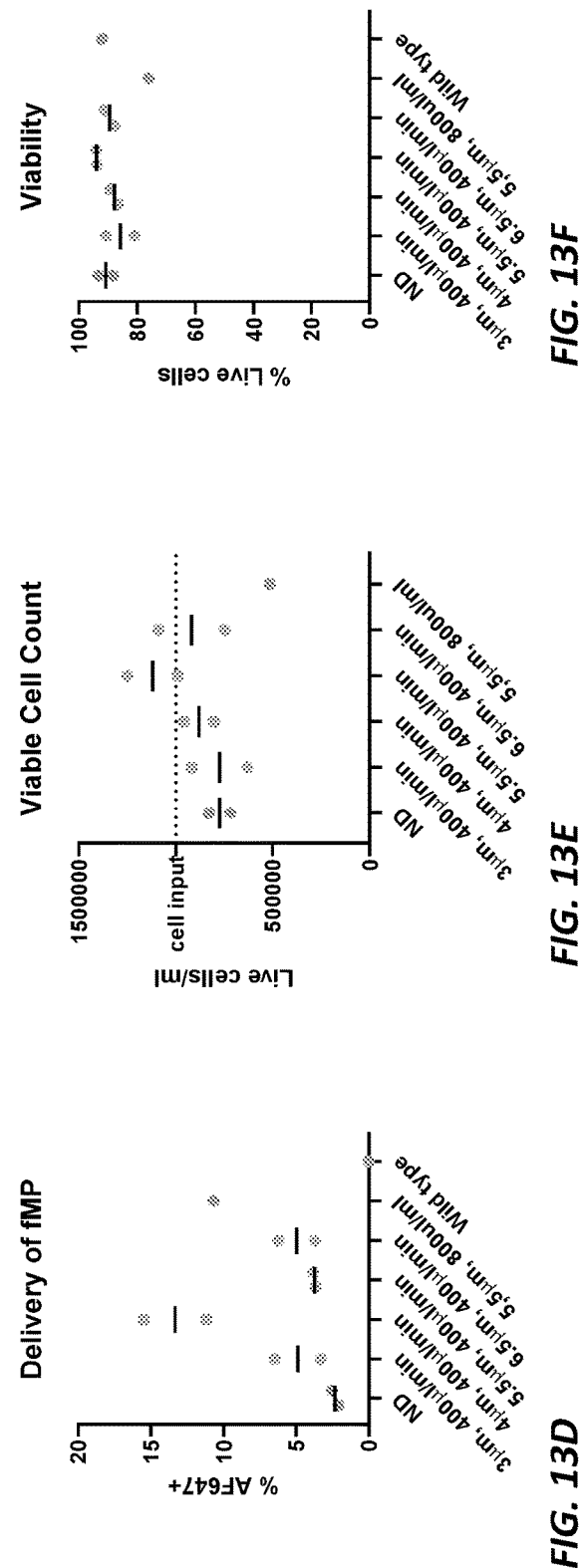

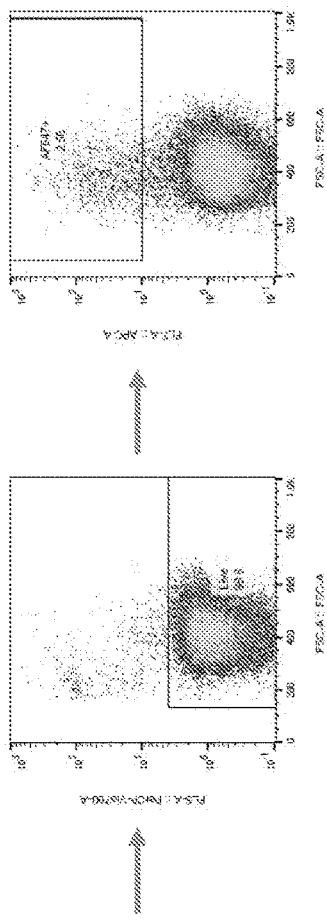
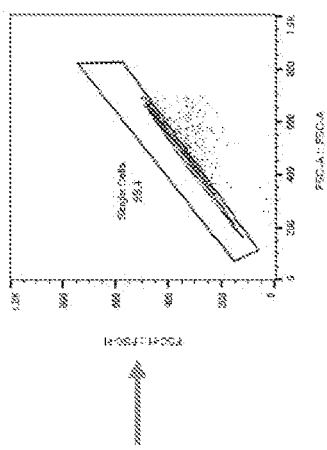
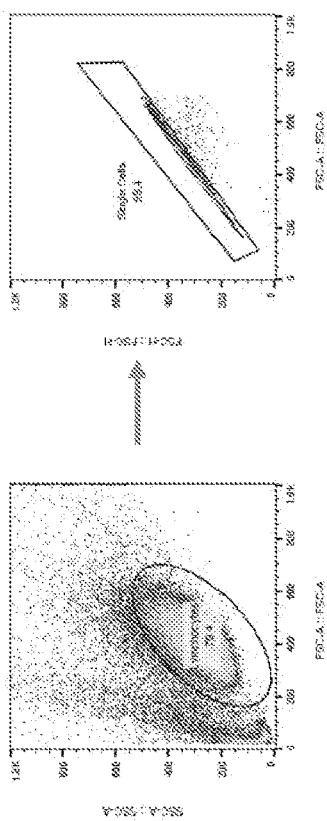
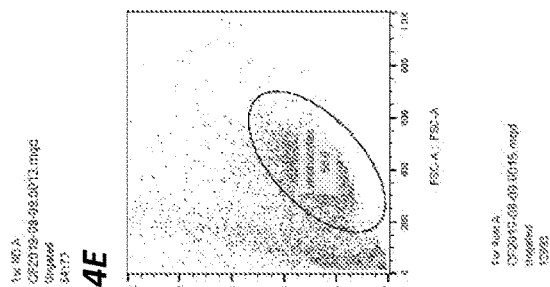
FIG. 14A  FIG. 14B  FIG. 14C  FIG. 14D
FIG. 14E  FIG. 14F  FIG. 14G  FIG. 14H

METHODS AND SYSTEMS FOR CELL LABELING AND IMAGING

CROSS-REFERENCE TO RELATED APPLICATIONS

This application is a national-stage filing of PCT International Application No. PCT/US2020/037330, filed on Jun. 11, 2020, which claims the benefit of U.S. Provisional Application No. 62/860,641, filed on Jun. 12, 2019, the disclosures each of which are incorporated herein by reference in their entireties.

BACKGROUND

Transporting imaging agents into cells may have many important applications in different fields, including medicine, translational medicine, regenerative medicine, cell therapy, biological and biomedical research, and more. Imaging agents may be transported into cells to facilitate imaging in vivo or in vitro. Methods used for cell imaging include magnetic resonance imaging (MRI), positron emission tomography (PET), single-photon emission computed tomography (SPECT), microscopy imaging, and the like. These methods all benefit from the availability of improved imaging reagents, in particular from the availability of cells that have been quickly and efficiently loaded with a variety of imaging agents, that remain viable, and that retain normal biological functionality.

SUMMARY

Provided herein are methods and systems for cell labeling and imaging. Also provided are cells modified according to the disclosed methods. In particular, the methods and systems utilize a microfluidic device for the delivery of substances, more specifically imaging agents, to target cells.

Accordingly, in one aspect, the disclosure provides methods for delivering a substance into a cell, comprising:

(a) providing a microfluidic device, wherein the microfluidic device comprises a channel that comprises a compressive element and a fluid within the microfluidic device, wherein the fluid comprises the cell and the substance, and wherein the substance is an imaging agent; and (b) subjecting the fluid to flow through the channel in contact with the compressive element, wherein the contact causes formation of at least one pore in a membrane of the cell, wherein the at least one pore enables an entry of the substance into the cell.

In some embodiments, the cell is an animal cell, more specifically a peripheral blood mononuclear cell, a lymphocyte, or even a T cell. In some embodiments, a gap between the compressive element and an interior surface of the channel is between about 2 μm and about 15 μm.

In some embodiments, the cell has a cell diameter, and a gap between the compressive element and an interior surface of the channel is less than or equal to about 20% of the cell diameter.

In some embodiments, the compressive element is a ridge, and more specifically the ridge has a width of between 15 μm and 250 μm.

In some embodiments, the fluid flows through the channel at a rate of from about 100 μL/min. to about 1,000 μL/min.

In some embodiments, the cell has a volume, and the compressive element is configured to reduce the volume of the cell, and more specifically, the volume is reduced temporarily.

In some embodiments, the channel is defined by at least a first wall and a second wall, wherein the first wall and the second wall are substantially rigid.

In some embodiments, the channel does not comprise a diversion channel.

In some embodiments, the microfluidic device comprises a sorting element, for example a magnetic sorting element or an optical sorting element.

In preferred embodiments, the imaging agent is a nanoparticle. The nanoparticle can be a graphite/carbon nanoparticle, a metal nanoparticle, a ceramic nanoparticle, a semiconductor nanoparticle, a polymeric nanoparticle, or a lipid-based particle.

In another aspect are provided modified cells prepared by any of the above methods.

In yet another aspect are provided methods of imaging a cell in a subject, wherein the methods comprise the steps of (a) treating the subject with any of the just-described modified cells, and (b) identifying the imaging agent within the subject. In some embodiments, the imaging agent is identified by magnetic resonance imaging. In some embodiments, the imaging agent is identified by optical imaging.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

FIGS. 1C and 1D show exemplary designs of microfluidic devices comprising microchannels. FIG. 1C shows a design with 4 separate microchannels, no cell focusing element, fewer chevron ridges, and ridges located near the end of the microchannel. FIG. 1D shows exemplary highly parallel microchannel designs suitable for scaling up rates of cell processing. Flow is from left to right in each case.

FIGS. 12A-12D illustrate the delivery of magnetic nanoparticles into activated mouse T cells.

FIGS. 13A-13F illustrate the delivery of magnetic nanoparticles into activated human PBMCs.

FIGS. 14A-14H show flow cytometry of human PBMCs after transfection with fluorescent magnetic nanoparticles at 1-week post-activation.

DETAILED DESCRIPTION

Figure 1A:
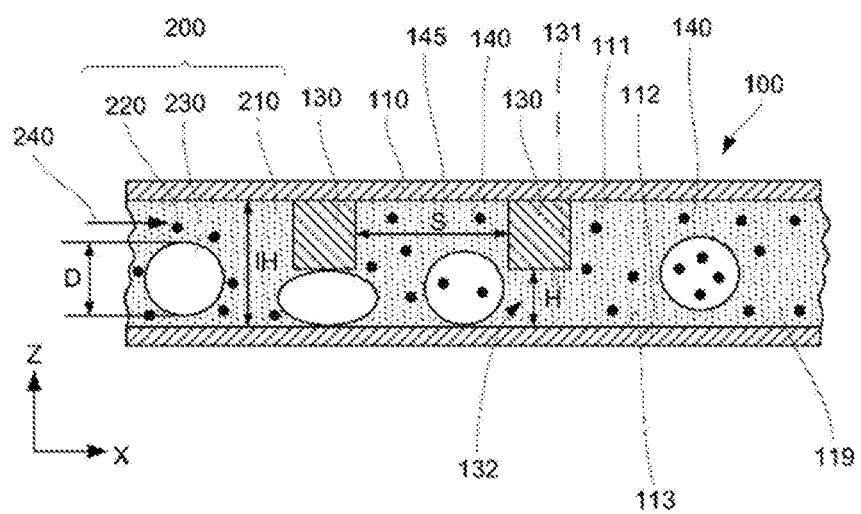
FIG. 1A shows a schematic cross-sectional view of an example microfluidic device of the present disclosure.

Current methods and systems for delivering imaging agents into cells often display low overall efficiency, are relatively slow, and may damage the cells. Therefore, recognized herein is a need for new methods and systems to transport imaging agents into cells more efficiently, at a higher rate, and with less damage to the cells.

Methods and systems for intracellular delivery can generally be divided into the following non-limiting classes: a) physical/non-viral approaches, such as mechanoporation, gene gun, ultrasound, electroporation, and laser; b) chemical/non-viral approaches, such as cationic lipids/liposomes, polysaccharides, cationic polymers, cationic peptides, and micro-/nano-particles; and c) biological/viral approaches.

Among the physical/non-viral approaches, electroporation is most commonly used to transfect nucleic acids into higher cells. Although electroporation can, in principle, be applied to all cell types and at all stages of the cell cycle, damage to a cell by electroporation can be serious, compared with some other physical methods. Although the principle of electroporation is applicable to all cell types, its efficiency can depend on the electrical properties of the cells. Smaller cells require higher electrical fields to permeate. This is an important consideration for ex vivo gene delivery, especially to hematopoietic cells. Cells with less conductive contents (such as adipocytes) are considered to be less susceptible to damage from electroporation. For charged substances, such as nucleic acids, electroporation is often improved by including non-natural chemical agents in the formulations. Finally, electroporation requires the use of conductive buffers, and it is not suitable for the intracellular delivery of metallic imaging agents, such as, for example, nanoparticle trackers comprising iron oxide nanoparticles and the like.

Methods and Systems for Delivering Substances into Cells

In one aspect, the present disclosure therefore provides methods and systems for delivering a substance into a cell, in particular, where the substance to be delivered is an imaging agent. The methods may comprise providing a microfluidic device, wherein the microfluidic device comprises a channel that comprises a compressive element and a fluid within the microfluidic device, wherein the fluid comprises the cell and the substance. The methods may also comprise subjecting the fluid to flow through the channel in contact with the compressive element, wherein contact with the compressive element causes formation of at least one pore in a membrane of the cell, wherein the at least one pore enables an entry of the substance into the cell.

Exemplary microfluidic devices suitable for the intracellular delivery of imaging agents according to the above methods are provided in PCT International Application Nos. PCT/US19/64310, filed on Dec. 3, 2019, and PCT/US20/33298, filed on May 15, 2020, the disclosures each of which are incorporated herein by reference in their entireties. It is generally understood that contact of a cell with the compressive element in these devices may result in compression of the cell and the formation of transient pores in the cell membrane. Substances within the extracellular fluid may accordingly be delivered into the cell through the transient pores in the cell membrane as the cell expands. Flow of the imaging agent into the cell may also be facilitated through diffusion, such as via a pressure gradient and/or concentration gradient, and/or by convection or a combination thereof. The above-described delivery method, which is also referred to as cell volume exchange for convective transfer (cell VECT), is thought to be distinct from current diffusive mechanoporation platforms, both in mechanism and capability. See, e.g., Liu et al. (2018) *Materials Today* 21:703. Specifically, diffusive microfluidic mechanoporation methods use gradual constrictions to impart shear stress on cells in a manner that facilitates smooth cell flow and thus slower deformation, whereas cell VECT relies on multiple, rapid, high-strain compressions to cause cell volume change and relaxation without impacting cell viability. The methods are also distinct from the normal endosomal uptake of extracellular materials by cells, which is a slow process and which delivers the materials to an endosomal compartment rather than the cytosol. The delivery methods are considered non-invasive, and cell viability and membrane integrity are maintained during the delivery. The rate at which a substance can be delivered to a cell using these methods is considerably higher than delivery by diffusion, endocytosis, and/or a combination of diffusion and endocytosis.

For a given cell within a population of cells, one or more pores may be formed in a membrane of the cell, and one or more imaging agents may be directed through the one or more pores. At least a subset of a population of cells may be processed simultaneously (e.g., using a plurality of microchannels) or sequentially, such as if the population of cells is directed through the microchannel sequentially.

The cell or cells may be processed such that each processed cell may contain an average amount or concentration of imaging agent. The imaging agent may be in the cytoplasm of each processed cell. The imaging agent may be on the cell surface, in the cytosol, in the nucleus, in the nucleolus, in the endosomes, and/or any organelle or subcellular region of the cell. The average amount of imaging agent in each processed cell may be greater than or equal to about 0.01 picogram (pg), 0.02 pg, 0.03 pg, 0.4 pg, 0.5 pg, 0.6 pg, 0.7 pg, 0.8 pg, 0.9 pg, 0.10 pg, 0.11 pg, 0.12 pg, 0.13 pg, 0.14 pg, 0.15 pg, 0.16 pg, 0.17 pg, 0.18 pg, 0.19 pg, 0.20 pg, 0.21 pg, 0.22 pg, 0.23 pg, 0.24 pg, 0.25 pg, 0.26 pg, 0.27 pg, 0.28 pg, 0.29 pg, or 0.30 pg. The average amount of imaging agent in each processed cell may be less than or equal to about 0.30 pg, 0.29 pg, 0.28 pg, 0.27 pg, 0.26 pg, 0.25 pg, 0.24 pg, 0.23 pg, 0.22 pg, 0.21 pg, 0.20 pg, 0.19 pg, 0.18 pg, 0.17 pg, 0.16 pg, 0.15 pg, 0.14 pg, 0.13 pg, 0.12 pg, 0.11 pg, 0.10 pg, 0.9 pg, 0.8 pg, 0.7 pg, 0.6 pg, 0.5 pg, 0.4 pg, 0.03 pg, 0.02 pg, or 0.01 pg. The plurality of processed cells may have an average content of imaging agent that may be greater than or equal to about 0.01 pg, 0.02 pg, 0.03 pg, 0.4 pg, 0.5 pg, 0.6 pg, 0.7 pg, 0.8 pg, 0.9 pg, 0.10 pg, 0.11 pg, 0.12 pg, 0.13 pg, 0.14 pg, 0.15 pg, 0.16 pg, 0.17 pg, 0.18 pg, 0.19 pg, 0.20 pg, 0.21 pg, 0.22 pg, 0.23 pg, 0.24 pg, 0.25 pg, 0.26 pg, 0.27 pg, 0.28 pg, 0.29 pg, or 0.30 pg. The processed cell or cells may have an average content of imaging agent that may be less than or equal to about 0.30 pg, 0.29 pg, 0.28 pg, 0.27 pg, 0.26 pg, 0.25 pg, 0.24 pg, 0.23 pg, 0.22 pg, 0.21 pg, 0.20 pg, 0.19 pg, 0.18 pg, 0.17 pg, 0.16 pg, 0.15 pg, 0.14 pg, 0.13 pg, 0.12 pg, 0.11 pg, 0.10 pg, 0.9 pg, 0.8 pg, 0.7 pg, 0.6 pg, 0.5 pg, 0.4 pg, 0.03 pg, 0.02 pg, or 0.01 pg. The variation of the amount of imaging agent in the cell among different individual processed cells may be low, such that labeling may be considered homogenous or uniform. Uniform or homogenous labeling of the cells may contribute to the success of cell tracking.

The cell or cells may be therapeutic cells, such as cells that may have or be suspected of having a therapeutic effect. The cell or cells may be used for cell therapy in vivo. For example, the cell or cells may be adipose fat derived stem cells (ADSC). ADSC cells may be used for cartilage-repair. Therapeutic cells may be delivered to a subject or a part of a subject, such as an organ of a subject. The subject may be an animal, such as a human. Cell therapy may be more successful with accurate knowledge of delivery and retention of such therapeutic cells that may be used for cell therapy in vivo. For example, such knowledge may comprise the delivery and retention of therapeutic cells to a target organ of a subject. For example, there may be a need for identifying the location of a therapeutic cell(s) that may be injected into a patient. If a therapeutic cell(s) is not localized at a treatment site (e.g., disease site or location), the treatment may not be as effective as compared to an outcome of a treatment in which the therapeutic cell(s) is localized at treatment site. A therapeutic cell(s) may comprise markers that may allow for cell tracking. Delivering imaging agents or markers to a therapeutic cell(s) may facilitate tracking such therapeutic cell(s) in vivo and may contribute to improved therapy.

The cell or cells may be any types of cells. Non-limiting examples of cells may include plant cells, animal cell, human cells, insect-derived cells, bacteria, adherent cells, suspension cells, cardiomyocytes, primary neurons, HeLa cells, stem cells, ESCs, iPSCs, hepatocytes, primary heart valve cells, primary hematopoietic cells, gastrointestinal cells, k562s, lymphocytes, T-cells, Bcells, natural killer cells, dendritic cells, hematopoetic cells, beta cells, somatic cells, germ cells, embryos (human and animal), zygotes, gametes, 1205 Lu, 1321N1, 143B, 22Rv1, 23132/87, 293, 293 (suspension), 293-F, 293T, 2A8, 2PK3, 300.19, 32D, 3A9, 3T3-L1 ad, 3T3-L1 pre-ad, 3T3-Swiss albino, 4T1, 5838 Ewing's, 661W, 697, 7-17, 720, 721.174, 721.22, 721.221, 786-0, A-10, A-375, A-431, A-498, A-673, A172, A2.A2, A20, A2058, A2780, A3.01, A549, A7r5, Adipocyte (pre), Adipocyte (pre)-human diabetes Tp.2, Adipose stem cell-human diabetes Tp.1, Adipose stem cell-human diabetes Tp.2, Adipose stem cell, Adrenocortical, AGN2a, AGS, AML, AML-DC, ARH 77, ARPE-19, arteries mesenteric (MA), astrocyte glioblastoma line-mouse, Astrocyte-human (NHA), Astrocyte-mouse, Astrocyte-rat, Astrocyte, ASZ001, AT-1, ATDCS, B cell-human, B-cell-lymphoma cell line, B-cell-mouse-stimulated, B-CLL, b-END, B157, B16-F0, B16-F1, B16-F10, B35, B3Z, B65, BA/F3, Babesia Bovis, Balb/c 3T3, BC-1, BCBL1, BCL1 clone 5B 1b, BCL1.3B3, BE2-M17, BEAS-2B, Beta islet cell, BeWo, BHK-21, BHP2-7, BJ, BJ1-hTERT, BJAB, BJMC3879, BL2, BL3, BLCL, BPH1, BRIN-BD11, BT-20, BT549, BV173, BV2, BW5147, BW5147.3, BxPC-3, C10/MJ2, C17.2, C28A2, C2C12, C2F3, C3H10T1/2, C57MG, C6, C8161, CA46, Caco-2, Caco-2/TC7, Cal-1, Cal-85-1, CAL51, Calu-3, Calu-6, CAMA 1, CAP (CEVEC's Amniocyte Production), Capan-1, Capan2, Cardiomyocyte, CCD18Co, CCRF-CEM, CCRF-CEM C7, CD34+ cell, CEM-C7A, CEM.C1, Cervical stroma, CFBE, CH1, CH12, CH12F3, CH27, CHM 2100, CHO (suspension), CHO-DG44, CHO-DG44 (DHFR−), CHO-K1, CHO-S cells sold under the trademark FREESTYLE by Thermo Fisher Scientific (Waltham, Mass.), CHO-S (suspension), Chondrocyte (human (NHAC-kn)), Chondrocytes (mouse), Chromaffin cells (cow), CML, Colo201, Colo205, Colo357, Cor.At Cardiomyocytes (from ESC-mouse), COS-1, COS-7, CRFK, CTLL-2, CV1, Cytokine induced killer, Cytotrophoblast, D1 ORL UVA, D1F4, D283, D425, D54, Dante-BL, Daudi, DCIS, Dendritic cell (human), Dendritic cell (mouse-immat.-BALB/c), Dendritic cell (mouse-immat.-C57BL/6), Dendritic cell (mouse-mature-BALB/c), Dendritic cell (mouse-mature-C57BL/6), Dendritic cell (plasmacytoid-human), Dendritic cell (rhesus macaque), DEV, DHL4, DHL6, DLD-1, DO11.10, DOHH-2, Dorsal root gang (DRG), Dorsal root gang (DRG) (rat), Dorsal root gang (DRG) (chicken), Dorsal root gang (DRG) (mouse), DOV13, DPK, DT40, DU 145, EAhy926, eCAS, ECC-1, EcR293, ECV304, Eimeria Tenella, EJM, EL4, Embryonic fibroblast, Embryonic fibroblast (chicken), Embryonic fibroblast (mouse (MEF) immort), Embryonic fibroblast (mouse (MEF) primary), Embryonic stem (ES) cell (human), Embryonic stem (ES) cell (mouse), EMC, Endothelial, Endothelial-aortic-cow (bAEC), Endothelial-aortic-human (HAEC), Endothelial-aortic-pig, Endothelial-coronary art-human (HCAEC), Endothelial-lung-sheep, Endothelial-Mammary-Human, Endothelial-MV dermal-human adult, Endothelial-MV dermal-human neo, Endothelial-MV lung-human (HMVEC-L), Endothelial-pulmonary artery-human, Endothelial-umbilical vn-human (HUVEC), EpH4, Epithilial, Epithelial model-cornea-human-immort., Epithelial-airway-human, Epithelial-airway-pig, Epithelial-alveolar-rat, Epithelial-bronchial (NHBE)-human, Epithelial-bronchial-monkey, Epithelial-cornea-human, epithelial-ES-derived-human, Epithelial-lung type II-human, Epithelial-mammary-human (HMEC), Epithelial-mammary-mouse, Epithelial-prostate (PrEC)-human, Epithelial-renalhuman (HRE), Epithelial-retinal pigment-human, Epithelial-Small Airway-human (SAEC), ESS-1, F36P, F9, FaQ, FDC-P1, FDCP-Mix, Fibroblast, Fibroblast-aortic adventitial-human, Fibroblast-cardiac-rat, Fibroblast-cow, Fibroblast-dermal (NHDF-Neo)-human neo, Fibroblast-dermal (NHDF-Ad)-human adult, Fibroblast-dermal-human, Fibroblast-dermal-macaque, Fibroblast-ES-derived-human, Fibroblast-foreskin-human, Fibroblast-humanGM06940, Fibroblast-lung-human normal (NHLF), Fibroblast-lung-mouse, Fibroblastlungrat, Fibroblast-pig, Fibroblast-tunica albuginea-human, FL5.12A, FM3A, FRT, G-361, GaMG, GD25, GH3, GIST882, GM00131, GM05849, GM09582, Granta519, Granule cell, Granule cell (CGC)-mouse, Granule cell (CGC)-rat, GT1-7, H2K mdx, H4, H4IIE, H69, H9, H9c2 (2-1), HaCaT, HC11, HCA7, HCC1937, HCC1954, HCT 116, HCT15, HDLM-2, HDQ-P1, HEL 92.1.7, HeLa, HeLa S3, Hep G2, Hep1B, HEPA 1-6, Hepa-1c1c7, Hepatocyte, Hepatocyte immortalized-mouse, Hepatocyte-human, Hepatocyte-mouse, Hepatocyte-rat, HFF-immort., HFF-1, HFFF2, HIB1B, High Five, HK-2, HL-1, HL-60, HMC-1, HMEC-1, HMLE, HMy2.CIR (C1R), HNS, HPB-ALL, Hs 181.Tes, Hs 578T, HT-1080, HT-29, HT22, HT29-D4, HTC, HU609, HuH7, HuT 102, HuT 78, HUV-EC-C, IEC-6, IEC18, IGROV1, IHH, IM9, IMR-32, IMR-90, INS-1, INS-1E, INS1 832/13, IOSE29, IOSE80, iPS-human, J-774, J-Lat 6.2, J558L, J774A.1, JB6-1, JB6-2, JeKo-1, Jurkat, Jurkat-modified, JVM, JVM-2, K-562, Karpas 299, KE-37, Kelly, Keratinocyte, Keratinocyte-(NHEK-Ad) human adult, Keratinocyte-(NHEK-neo) human neonatal, KG-1, KG-1a, KHYG1, KIT225, KM-H2, KS, KTA2, Ku812, L-428, L1.2, L1210, L1236, L3.6SL, L5178Y, L540, L6, L87/4, LA-N-2, LA-N-5, LAMA-84, Langerhans cells, Langerhans cells-human, LAZ 221, LbetaT2, LCL, Leishmania tarentolae, LLC-MK2, LLC-PK1, LLC-PK10, LN229, LNC, LNCaP, LoVo, LP1, LS180, LX-2, LY2, M-07e, M28, MA 104, Macrophage, Macrophage-human, Macrophage-mouse, Macrophage-mouse-BALB/c, Macrophage-mouse-C57BL/6, MC-38, MC/9, MC3, MC3T3, MC3T3-E1, MC57G, McA-RH7777, MCF10, MCF10A, MCF7, MCF7 tet, MCT, MDA-MB-231, MDA-MB-361, MDA-MB-415, MDA-MB-453, MDA-MB-468, MDBK, MDCK, MDCK II, MDCK-C7, ME-1, MedB1, MEG-01, MEL, melan-a, Melanocyte, Melanocyte-(NHEM-neo)-human neonatal, Mesangial cells-Human (NHMC), Mesench. stem (MSC)-pig, Mesenchymal stem cells, Mesenchymal stem cell (MSC)-human, Meso17, Met-1fvb2, MEWO, MFM223, MG-63, MGR3, MHP36, MiaPaCa-2, mIMCD3, MIN6, Mino, MKN-1, mlEND, MLO-Y4, MLP29, MM.1S, MN9D, MOLM-14, MOLT-4, Molt16, Monocyte, MonoMac1 (MM1), MonoMac6 (MM6), Mouse L cell, MPC-11, Mpf, mpkCCD(c14), MPRO, MRC-5, MT4, MTC, MTLn3, Mutu1, MUTZ-2, MUTZ3, MV-4-11, Myoblast, Myoblast-(HSMM) human, Myofibroblast, Myofibroblast-human hepatic, Myofibroblast-rat hepatic, MzCHA-1, N11, N114P2, N1E115, N9, NALM-6, Namalwa, Natural killer (NK)-human, NB-4, NBL-6, NCEB-1, NCI-H1299 (H1299), NCI-H1435, NCI-H2170, NCI-H226 (H226), NCI-H292, NCI-H295R (H295R), NCIH358 (H-358; H358), NCI-H460 (H460), NCI-H69 (H69), NCI-H929 (H929), NCM460, NCTC clone 929, Neural precursor-cow, Neural stem cell (NSC), Neural stem cell (NSC)-human, Neural stem cell (NSC)-mouse, Neural stem cell (NSC)-rat, Neuro-2a (N2a), Neuroblastoma, Neuron-cortical-mouse, Neuron-hippo/cortical-rat, Neuron-hippocampal-chicken, Neuronhippocampal-mouse, Neuron-mesencephalic-rat, Neuron-striatal-mouse, Neuron-striatal-rat, NG108-15, NIH/3T3, NK-92, NK3.3, NKL, NKL1, NRK, NRK-49F, NRK52E, NS0, NS1, NSC34, NTERA-2 c1.D1, OCI-AML1a, OCI-AML2, OCI-AML3, OCI-LY-10, OCI-LY-3, Olfactory neuron-rat, Oligodendrocyte-rat, OP-6, OVCAR3, *P. knowlesi*, P19, P3X63Ag8, P815, PAC2, Pam212, PANC-1, Panc89, PBMC-human, PC-12, PC-3, Perkinsus marinus, Plasmodium berghei, Plasmodium falciparum, Plasmodium yoelii, PLB-985, PMC42, Podocyte-mouse, PS1, PtK1, R28, R9ab, RAEL, RAG2–/–R2BM3-7, Raji, Ramos, Rat2, RAW 264.7, RBL, RBL-1, RBL-2H3, RCC26, RD, REH, Renal Cell Carcinoma, Renal proximal tubule cellshuman, RF/6A, RFL-6, Rh4, Rin 1046, RIN m5f, RKO, RL-952, RMAS, RPMI8226, RS4-11, RT4, RWPE-1, S1A.TB.4.8.2, S49, SA1N, SAM-19, Saos-2, SbC12, Schneider's Drosophila Line 2, Schwannoma cell line, SCI-ET27, SCID.adh, SET-2, Sf9 (ovarian), Sf9 (ovarian), SGHPL-4, SH-SYSY, SIRC, SK-BR-3, SK-MEL 100, SK-MEL 103, SK-MEL 147, SK-MEL 173, SK-MEL 187, SK-MEL 19, SK-MEL 192, SK-MEL 197, SK-MEL 23, SK-MEL 29, SKMEL 31, SK-MEL 85, SK-MEL 94, SK-MEL-28, SK-MEL-5, SK-N-AS, SK-N-DZ, SK-N-FI, SK-N-MC, SK-N-SH, SK-OV-3, Skeletal muscle-(SkMC) human, SKNAS, SKW6.4, SMCairway (HASM)-human, SMC-aortic (AoSMC)-human, SMC-aortic (AoSMC)-mouse, SMCaortic (AoSMC)-pig, SMC-aortic (AoSMC)-rat, SMC-bladder (BdSMC)-human, SMCbronchial-human normal (BSMC), SMC-cervix-human, SMC-coronary artery-human (CASMC), SMC-coronary-rat, SMC-pul.artery (PASMC)-human, SMC-rat, SMC-ureterhuman, SMC-uterus-human (UtSMC), SMC-vascular-human, SMC-vascular-monkey, SMCvascular-rat, SP2/0, SP53, Stroco5, SUIT-2, SUM52PE, SUP-T1, SVEC 4-10, SW13, SW1353, SW48, SW480, SW620, SW837, SW872, Synoviocyte-human, SZ95, T cell line-chicken, T cell-human peripheral blood unstim., T cell-human stim., T cell-mouse-BALB/c, T cellmouse-C57BL/6, T cell-rabbit-stimulated, T-47D, T/C-28 a2, T/G HA-VSMC, T0, T1165, T2, T24, T84, TA3, TF-1, TG40, TGW, THP-1, TK6, TOM-1, Tot2, Trabecular meshwork-human, Trabecular meshwork-pig, Trophoblast-human, Trophoblast-mouse, Trypanosoma brucei, Trypanosoma congolense, Trypanosoma cruzi, TS/A, TT, Turbinate cell-cow, U-2 OS, U-2940, U-87 MG, U-937, U138MG, U251, U251MG, U266B1, U373, U373MG, U87, UACC903, UMR 106-01, UMSCC-14A, UT7, UT7 GM-CSF dependent, UT7-Epo, UT7-EpoS1, UT7-TPO, V5, V79, VAL, Vero, WEHI-231, WEHI-279, WERI-Rb-1, WI-38, WIL2-S, WM-266-4, WM35, WRO, XG6, XG6, Z-138, Zebrafish cell line, ZF4, or combinations thereof. In some cases, the cells comprise T cells, hematopoietic stem cells (HSCs), induced pluripotent stem cells (iPSCs), Chinese hamster ovary (CHO) cells, nonphagocytic cells, or combinations thereof.

In preferred embodiments, the cell or cells is from an animal, such as a mammal, and in particular a human. In some embodiments, the cell is a peripheral blood mononuclear cell. Even more specifically, the peripheral blood mononuclear cell is a lymphocyte, such as a T cell. In some specific embodiments, the cell is a hematopoietic stem cell.

The imaging agents may comprise particles, such as nanoparticles, dyes, peptides, fluorescent substances, such as fluorescent peptides, beads, antibodies, tags, such as fluorescent tags, fluorogenic substrates, fluorophores, biosensors, activity-based biosensors, peptide-based biosensors and/or reporters, and more. In some embodiments, the imaging agents may comprise a combination of any of the above agents, for example a combination of a nanoparticle and a fluorescent dye. Imaging agents may comprise labeling agents or tracking agents. Imaging agents may label the cells to facilitate cell tracking in vivo or in vitro. Tracking may comprise tracking cell location over time, cell proliferation, cell growth, cell death, cell deformation, sub-cellular tracking, such as tracking the activity of certain members in certain biochemical pathways, tracking certain organs, organelles, or enzymes, or more.

The average amount of imaging agent in the processed cell or cells may be sufficient to facilitate detectable signal for imaging. The average amount of imaging agent in the processed cell or cells may be sufficient to facilitate sensitive imaging of the cells. The average amount of imaging agent in the processed cell or cells may be sufficient to provide a high signal to noise ratio as detected by any imaging or scanning technique (e.g., magnetic resonance imaging, or MRI). The average amount of imaging agent in the processed cell or cells may provide accurate information about, or permit accurate identification of, the processed cells through imaging. For example, use of imaging agents may permit identification of the cell or cells at an accuracy of at least about 50%, 60%, 70%, 80%, 90%, 95%, 99%, or more.

The method may further include using a plurality of imaging agents to image a plurality of cells. Imaging may be performed collectively over the lifetime of the cells. Imaging may be performed statistically or dynamically over time. Images may be captured at one or more certain time points during the course of an experiment or a test. Imaging may comprise in vivo or in vitro imaging. Imaging may comprise high-speed imaging, time-lapse imaging, high-resolution fluorescent microscopy imaging, confocal microscopy imaging. Imaging may comprise clinical imaging or scanning. Imaging techniques may comprise positron emission tomography (PET), magnetic resonance imaging (MRI), myocardial perfusion imaging (MPI), Single-photon emission computed tomography (SPECT), or more. Imaging agents may comprise contrast agents such as, for example, MRI agents, PET agents, MPI agents, SPECT agents, or more. Imaging agents may be approved by the United States Food and Drug Administration (FDA). For example, imaging agents may comprise safe contrast agents for post-transplant in vivo imaging.

The methods may further include using the imaging agents to image the modified cells. The imaging may in some embodiments be performed using, for example, MRI. The imaging agents may be gadolinium-based. The gadolinium-based contrast agents may comprise gadobenic acid, gadobutrol, gadodiamide, gadofesveset, gadolinium, gadopentetic acid, gadoteric acid, gadoteridol, gadoversetamide, gadoxetic acid. The imaging agent may be ferric ammonium citrate, mangafodipir, ferumoxsil, ferristene, iron oxide nanoparticles, or perflubron.

The imaging may in some embodiments be performed using, for example, X-ray and/or computerized tomography (CT) scans. The imaging agents may comprise diatrizoic acid, metrizoic acid, iodamide, iotalamic acid, ioxitalamic acid, ioglicic acid, acetrizoic acid, iocarmic acid, methiodal, diodone, metrizamide, iohexol, ioxaglic acid, iopamidol, iopromide, iotrolan, ioversol, iopentol, iodixanol, iomeprol, iobitridol, ioxilan, iodoxamic acid, iotroxic acid, ioglycamic acid, adipidone, iobenzamic acid, iopanoic acid, iocetamic acid, sodium iopodate, tyropanoic acid, calcium iopodate, ethyl esters of iodised fatty acids, iopydol, propyliodone, iofendylate, lipiodol, or barium sulfate, barium, gastrografin, or iodine agents.

The imaging may in some embodiments be performed using, for example, ultrasound. In some cases the imaging agent can be microspheres of human albumin, microparticles of galactose, peflenapent, microspheres of phospholipids, or sulfur hexafluoride.

The imaging may in some embodiments be performed using, for example, positron emission tomography (PET) scan. The imaging agents may be radioactive substances. The imaging agents may be simple sugars such as glucose. Imaging agents may be fluorodeoxyglucose (FDG).

The method may comprise labeling cells for cell imaging or cell tracking in a subject or a part of a subject. The term "subject," as used herein, generally refers to an animal, such as a mammal (e.g., human) or avian (e.g., bird), or other organism, such as a plant. For example, the subject can be a vertebrate, a mammal, a rodent (e.g., a mouse), a primate, a simian, or a human. Animals may include, but are not limited to, farm animals, sport animals, and pets. A subject can be a healthy or asymptomatic individual, an individual that has or is suspected of having a disease (e.g., cancer) or a pre-disposition to the disease, and/or an individual that is in need of therapy or suspected of needing therapy. A subject can be a patient. A subject may be a laboratory mouse. The subject may be a pig. A part of a subject may comprise an organ of a subject. An organ of a subject may comprise a tissue, a brain, a muscle, a bone, or other parts of a subject.

The imaging agents may in some embodiments be particles. Particles may comprise, for example, large molecules and/or nanoparticles. The imaging agents may have an average molecular weight greater than or equal to about 0.5 megadaltons (MDa), 0.6 MDa, 0.7 MDa, 0.8 MDa, 0.9 MDa, 1.0 MDa, 1.1 MDa, 1.2 MDa, 1.3 MDa, 1.4 MDa, 1.5 MDa, 1.6 MDa, 1.7 MDa, 1.8 MDa, 1.9 MDa, 2.0 MDa, 2.1 MDa, 2.2 MDa, 2.3 MDa, 2.4 MDa, 2.5 MDa, 2.6 MDa, 2.7 MDa, 2.8 MDa, 2.9 MDa, 3.0 MDa, 3.5 MDa, 4.0 MDa, 4.5 MDa, 5.0 MDa, 10.0 MDa, or more. The imaging agents may have an average molecular weight less than or equal to about 10.0 MDa, 5.0 MDa, 4.5 MDa, 4.0 MDa, 3.5 MDa, 3.0 MDa, 2.9 MDa, 2.8 MDa, 2.7 MDa, 2.6MDa, 2.5 MDa, 2.4 MDa, 2.3 MDa, 2.2 MDa, 2.1 MDa, 2.0 MDa, 1.9 MDa, 1.8 MDa, 1.7 MDa, 1.6 MDa, 1.5 MDa, 1.4 MDa, 1.3 MDa, 1.2 MDa, 1.1 MDa, 1.0 MDa, 0.9 MDa, 0.8 MDa, 0.7 MDa, 0.6 MDa, 0.5 MDa, or less. The imaging agents may have a molecular weight that is greater than or equal to about 0.5 megadaltons (MDa), 0.6 MDa, 0.7 MDa, 0.8 MDa, 0.9 MDa, 1.0 MDa, 1.1 MDa, 1.2 MDa, 1.3 MDa, 1.4 MDa, 1.5 MDa, 1.6 MDa, 1.7 MDa, 1.8 MDa, 1.9 MDa, 2.0 MDa, 2.1 MDa, 2.2 MDa, 2.3 MDa, 2.4 MDa, 2.5 MDa, 2.6 MDa, 2.7 MDa, 2.8 MDa, 2.9 MDa, 3.0 MDa, 3.5 MDa, 4.0 MDa, 4.5 MDa, 5.0 MDa, 10.0 MDa, or more. The imaging agents may have a molecular weight that is greater than or equal to about less than or equal to about 10.0 MDa, 5.0 MDa, 4.5 MDa, 4.0 MDa, 3.5 MDa, 3.0 MDa, 2.9 MDa, 2.8 MDa, 2.7 MDa, 2.6MDa, 2.5 MDa, 2.4 MDa, 2.3 MDa, 2.2 MDa, 2.1 MDa, 2.0 MDa, 1.9 MDa, 1.8 MDa, 1.7 MDa, 1.6 MDa, 1.5 MDa, 1.4 MDa, 1.3 MDa, 1.2 MDa, 1.1 MDa, 1.0 MDa, 0.9 MDa, 0.8 MDa, 0.7 MDa, 0.6 MDa, 0.5 MDa, or less.

Each of the particles may have a size of greater than or equal to about 1, 5, 10, 15, 20, 25, 30, 35, 40, 45, 50, 55, 60, 65, 70, 75, 80, 85, 90, 95, 100, 110, 120, 120, 130, 140, 150, 200, 250, 300, 350, 400, 450, or 500 nanometers (nm). Each of the particles may have a size of less than or equal to about 500, 450, 400, 350, 300, 250, 200, 150, 120, 100, 90, 80, 70, 60, 50, 40, 30, 20, 10, 5, or 1 nanometers (nm).

The imaging agents may comprise iron oxide, such as, for example, ferumoxytol iron oxide. Iron oxide may further comprise iron oxide particles, such as iron oxide nanoparticles. Iron oxide nanoparticles may have a certain size, such as, for example, 30 nm ferumoxytol iron oxide nanoparticles. Nanoparticles may further comprise iron oxide particles surrounded by a carbohydrate coat. Nanoparticles may comprise ferumoxytol nanoparticles, iron oxide nanoparticles, supermagnetic iron oxide particles (SPIOs). In some cases, iron oxide nanoparticles may be nontoxic and biodegradable. In some examples, iron oxide nanoparticles may comprise the potential to be eliminated from the body by iron recycling mechanisms after delivery to the cells in vivo. Supermagnetic iron oxide nanoparticles may comprise Ferumoxides (Feridex® IV, Berlex Laboratories), Ferucarbotran (Resovist®, Bayer Healthcare), Ferumoxtran-10 (AMI-227 or Code-7227, Combidex®, AMAG Pharma; Sinerem®, Guerbet), NC100150 (Clariscan®, Nycomed,) and (VSOP C184, Ferropharm), Ferumoxytol (Feraheme®). Ferumoxytol (Feraheme®) is approved for the treatment of iron deficiency in chronic kidney diseases. Ferumoxytol may be comprised of iron oxide particles surrounded by a carbohydrate coat. A supermagnetic iron oxide particle may have been clinically tested as an MRI contrast agent, and may have been approved for use in humans and/or animals. Alternatively, the supermagnetic iron oxide particle may not have been clinically tested as an MRI contrast agent. As an example, the iron oxide nanoparticle ferumoxytol is approved by the United States Food and Drug Administration (FDA) for use in humans.

The imaging agents may in some embodiments be an agent that is commonly referred to as a contrast agent. Non-limiting examples of contrast agents include Cu-ATSM, Cu diacetyl-bis(N-methylthiosemicarbazone) also called ATSM or copper 64, F-fluorodeoxyglucose (FDG), radioactive sugar molecules, F-fluoride, fluorothymidine (FLT), radio labeled imaging agents, F-fluoromisonidazole (FMISO), Gallium, Technetium-99m, Thallium, and radioactive tracers. Contrast agents may be or may comprise oral contrast agents.

In embodiments where the imaging agent is a particle, the particle can be a graphite/carbon nanoparticle, a metal nanoparticle, a ceramic nanoparticle, a semiconductor nanoparticle, a polymeric nanoparticle, or a lipid-based particle, as would be understood by those of ordinary skill in the art. Metal nanoparticles include gold nanoparticles, iron nanoparticles, for example the iron oxide nanoparticles described above, silver nanoparticles, and bimetallic or alloy nanoparticles, for example core-shell particles and Fe—Pt particles.

In embodiments where the imaging agent is a particle, the particle can further comprise a drug or a nucleic acid. Unmodified drugs and nucleic acids are often difficult to target to specific cell types and to specific subcellular locations, but they can be conjugated to nanoparticles as a biocompatible means for improved therapeutic delivery. Use of such therapeutic approaches, however, depends on an efficient mechanism for the targeting and delivery of the modified nanoparticles to and into cells. Although drug- or nucleic acid-conjugated nano-particles can be taken up by cells through the normal endocytosis pathway, larger and more complex particles may not enter cells by this mechanism. The methods of the instant disclosure therefore facilitate delivery of nanoparticles comprising drugs and/or genes in an optimum dosage range, leading to better therapeutic efficiency of drugs and reduced side effects.

The microfluidic device may comprise a plurality of microchannels. A plurality of microchannels may be one or more microchannels. The microfluidic device may comprise a principal axis. The principal axis may be parallel to the plurality of microchannels. The method may further comprise subjecting one or more cells to flow through the microchannel of the microfluidic device. As the cells flow through the microchannel, the cells may be in contact with the compressive element which is comprised in the microchannel. The microchannel may have a cross-sectional dimension that is greater than or equal to about 1 micrometers (µm), 5 µm, 10 µm, 15 µm, 20 µm, 30 µm, 40 µm, 50 µm, 60 µm, 70 µm, 80 µm, 90 µm, 100 µm, 150 µm, 200 µm, 250 µm, 300 µm, 350 µm, 400 µm, 450 µm, 500 µm, 600 µm, 700 µm, 800 µm, 900 µm, 1,000 µm, or more. In some cases, the cross-sectional dimension of the channel may be less than or equal to about 2,000 µm, 1,500 µm, 1,000 µm, 850 µm, 700 µm, 550 µm, 400 µm, 300 µm, 200 µm, 100 µm, 80 µm, 60 µm, 40 µm, 20 µm, 10 µm, or less. In some cases, the cross-sectional dimension of the channel may fall within any of the two values described above, e.g., between about 20 µm and about 1,000 µm, or between about 50 µm and about 100 µm. The microchannel(s) may allow fluids with various different fluid properties, such as density and/or viscosity, to flow. Microchannels may allow viscous solutions comprising viscous solutions of imaging agents and/or cells to flow. In some examples, one or more dead-zones may be formed in the flow. A dead-zone may lead to cell adherence to channel walls leading to cell adherence to channel walls and channel clogging. A dead-zone may be a stagnation zone (e.g., a zone with reduced or no flow). The performance of the device may be improved by removing dead-zones from the flow channel. Device geometry may be optimized to remove dead-zones from the flow. Surfactants and surface treatment may be used to reduce cell adherence to channel walls. Device outlets may be smoothed and passivated to reduce cell sticking and increase cell recovery.

The microchannel may comprise a plurality of compressive elements. The plurality of compressive elements may be one or more compressive elements. Each microchannel in the microfluidic device may include one or more compressive elements. The plurality of compressive elements may comprise ridges. The compressive elements may comprise compressive surfaces. Compressive surfaces may have different shapes and/or curvatures, such as rectangular, triangular, cylindrical, spherical, or other shapes and/or curvatures. The compressive elements may have different sizes, such as different surface areas. The plurality of compressive elements may facilitate a process which may permeabilize cell membranes. As a cell flows through the microfluidic device, the cell may be in contact with the compressive element which is comprised in the channel. The compressive element may result in a cell volume reduction. After the compression, the cell may recover part or all of its reduced volume by absorbing its surrounding media. The surrounding media may include one or more imaging agents which may be transported into the cell during the recovery process.

The compressive element may further comprise an angled compressive element, such as an angled surface relative to the principal axis of the microfluidic device. All compressive elements in the microfluidic device may have the same angle relative to the principal axis of the device. Different compressive elements may have different angles relative to the principal axis of the device. In some examples, the angles may be from 10 to 50 degrees, or from 20 to 80 degrees, or from 30 to 60 degrees. For example, the angles may by at least about 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or more. Angled compressive elements may facilitate the removal of unwanted substances from the microchannel. The unwanted substances may comprise, for example, nonviable cells, aggregates, clogging agents, excess imaging agents, excess amounts of other reagents, or more. The removal of unwanted substances may contribute to increasing the throughput and/or efficiency of cell processing.

The compressive elements may further comprise cell trappers. The cells may get compressed by getting trapped in device traps to facilitate the delivery of the imaging agents into the cells.

The plurality of cells may comprise greater than or equal to about 20 million, 50 million, 100 million, 200 million, 300 million, 400 million, 500 million, 600 million, 700 million, 800 million cells, or more. In some cases, the plurality of cells may be less than or equal to about 20 million, 50 million, 100 million, 200 million, 300 million, 400 million, 500 million, 600 million, 700 million, 800 million cells, or less.

The time period may be less than or equal to about 120 minutes, 100 minutes, 90 minutes, 80 minutes, 70 minutes, 60 minutes, 40 minutes, 30 minutes, 20 minutes, 15 minutes, 10 minutes, 5 minutes, 1 minute, or less. In some cases, the time period may be greater than or equal to about 120 minutes, 100 minutes, 90 minutes, 80 minutes, 70 minutes, 60 minutes, 40 minutes, 30 minutes (min), 20 minutes, 15 minutes, 10 minutes, 5 minutes, 1 minute, or more.

The efficiency of intracellular delivery of substances to cells according to the instant methods and devices may, in some embodiments, be expressed in terms of transfection efficiency. For example, transfection efficiency in the instant methods and devices can be at least 20%, 30%, 40%, 50%, 60%, 70%, 80%, 90%, or even higher. The efficiency of the method may be higher than diffusion-based methods and/or endocytosis. The efficiency of the method may be maintained while increasing the throughput and/or rate of cell processing.

The efficiency of processing may, in some embodiments, be expressed in terms of product yield or total transfection, where the value is calculated by multiplying transfection efficiency and recovery of live cells, in order to understand the percentage of cells engineered from the total number of cells input in the system or the overall throughput. In some embodiments, the product yield obtained using the instant methods and devices can be at least 10%, 20%, 30%, 40%, 50%, 60%, 70%, 80%, 90%, or even higher.

In some embodiments, performance of the instant methods and devices is assessed by the viability of cells that have been processed using the methods and devices of the instant disclosure. In some embodiments, the viability of cells is at least 10%, 20%, 30%, 40%, 50%, 60%, 70%, 80%, 90%, or even higher. Alternatively or in addition, performance of the methods and devices is assessed by the recovery of cells from the process. In some embodiments, the recovery of cells is at least 10%, 20%, 30%, 40%, 50%, 60%, 70%, 80%, 90%, or even higher.

The method may comprise designing, modifying, or optimizing the microfluidic device to address different applications. For example, specific applications of cellular therapy may be facilitated by making specific modifications to the device and/or the method. The microfluidic device may comprise replica-molded microfluidic chips. The microfluidic device may be a microfluidic chip, a microfluidic platform, or a series of microfluidic devices, chips, or platforms. The terms device, chip, and platform may be used interchangeably. Methods and systems may comprise in vitro and/or in vivo monitoring, wash stages, a hardware interface, and evaluating donor-to-donor variation to the cells and the imaging agents.

The microfluidic device may comprise a sorting element. The method may comprise distributing the cells to the channels. The cells may be equally distributed to the channels. The microfluidic device may or may not comprise one or more valves.

The microfluidic device may comprise one or more layers. The compressive element may be in any of the microfluidic device layers.

In an example, the microfluidic device may be fabricated using soft lithography. Polydimethylsiloxane (PDMS) may be casted onto an SU-8 master mold at a fixed temperature for a fixed duration of time, for instance, at about 80° C. for about 2 hours. Alternatively, injection molded hard plastic or silicone rubber may be used instead of PDMS. To prevent any possible deformation of microchannel, the microchannel may be reinforced by embedding high elastic modulus material such as a glass coverslip. The glass coverslip may be above the top surface of the microchannel. The molded part may then be plasma bonded to a glass slide to form a closed microchannel. The closed device may then be placed in a dry oven for at a fixed temperature for a fixed duration of time, for instance at about 80° C. for at least about 4 hours.

The device may be sterilized by autoclaving at a set temperature for a set period of time, for instance, at 120° C. for about 20 min. Alternatively, the device may be sterilized by treatment with Ultra Violet (UV) light or Ethylene Oxide (EO) gas.

The device channels may be passivated by a buffer or medium, for example, by a native medium. In an example, the native medium is Opti-MEM. Passivation may be performed by incubating the device with the buffer or medium at a set temperature for a set period of time. As a non-limiting example, the device may be incubated with buffer or medium at 4° C. overnight. Alternatively, passivation may be done in a 37° C. incubator or at room temperature for a set duration of time. Passivation buffer or medium may be any type of serum containing buffer or serum reduced medium such as Opti-MEM.

Cells and imaging agents may be prepared prior to loading on the device. For example, cells from a culture flask or cells obtained by another harvesting procedure may be re-suspended in a native medium. Native medium may contain imaging agents. Cell density may be adjusted to a desired amount. For example, cell density may be about 1 million cells/ml, about 2 million cells/ml, about 3 million cells/ml, about 4 million cells/ml, about 5 million cells/ml, about 6 million cells/ml, about 7 million cells/ml, about 8 million cells/ml, about 9 million cells/ml, about 10 million cells/ml, about 11 million cells/ml, about 12 million cells/ml, about 13 million cells/ml, about 14 million cells/ml, about 15 million cells/ml, about 20 million cells/ml, about 30 million cells/ml, about 40 million cells/ml, about 50 million cells/ml, about 60 million cells/ml, about 70 million cells/ml, about 80 million cells/ml, about 90 million cells/ml, about 100 million cells/ml, about 110 million cells/ml, about 120 million cells/ml, about 130 million cells/ml, about 140 million cells/ml, about 150 million cells/ml, or more. Cell density may change depending on cell types, payload types, payload concentrations, processing volume, and other factors. Payload concentration may be changed depending on cell types, cell density, payload types, processing volume, and other factors. A non-limiting optimal range for payload concentration may be from about 0.5 picogram/ml (pg/ml) to about 5.5 mg/ml. For example, payload concentration may be adjusted to about 500 µg/ml.

The prepared cell and/or imaging agent solution(s) may be loaded on or injected into the device. The samples or solutions may be introduced into the device using syringe pumps, gravity flow, pressure induced flow, or other methods. The solution(s) may flow through the microchannel(s). Flow rates may depend on various factors such as channel geometry, cell types, cell density, payload types, payload concentrations, and other factors. For example, for a 600*30 µm (width*height) rectangular microchannel, a non-limiting optimal range of flow rate may be 100-1000 µL/min. This flow rate may approximately translate into a cell flow velocity of 100-1000 mm/s. In some examples, a non-limiting optimal range of flow rate may be from about 10

μL/min to 10 ml/min. The processing volume for each microchannel may be set to an approximate value. For example, the processing volume may be set to 0.5 ml per microchannel. This value may change depending on cell types, cell density, payload types, and payload concentration. A non-limiting range for optimal processing volume per microchannel may be from about 10 μL to 100 ml.

The method may comprise subjecting a high concentration of imaging agents to flow. Subjecting a high concentration of imaging agents to flow in the device may contribute to increasing the content of imaging agent in the processed cells.

The method may further comprise a wash stage. The method may further comprise a plurality of wash stages. The wash stages may contribute to removing unwanted substances from the device or a part of the device and/or the cell surroundings. Unwanted substances may comprise non-delivered tracers and/or imaging agents. The removal of imaging agents may be important to maintain high-colocalization of the agents with the cells. Wash stages may improve the signal to noise ratio or the quality of the images. The method may comprise making modifications to the device to facilitate wash stages. One or more wash stages may be performed after cell labeling. Wash stages may be performed in a separate microfluidic device or off-chip. Labeled cells may be collected from the device and further washed. Alternatively, labeled cells may be injected into a second device for performing cell washing. Alternatively, wash stages may be integrated in the same microfluidic platform. For example, the method may comprise a mechanoporation followed by one or more washing stages.

The method may further comprise one or more sorting stages. Sorting stages may increase the efficiency of the labeling by separating and/or eliminating cells with no to small contents of imaging agents. Cells may be sorted based on viability. Viability sorting may separate live cells from dead cells and/or from cells that are in the process of apoptosis. Viability sorting may be performed prior to cell injection into subjects. Viability sorting may increase the purity of processed cells. The method may comprise using magnetic fields, electric fields, and more. The operations of the procedure may be performed in various microfluidic devices using various configurations, be integrated into a single microfluidic platform, or a combination thereof. Post-delivery sorting may be performed by applying a magnetic force to the microfluidic device.

The microfluidic device may comprise outlets with enclosed collectors for sterile operation.

The microfluidic device may comprise multiple channels. The number of channels in the microfluidic device may be 1, 2, 3, 4, 5, 6, 7, 8, 9, 10, 11, 12, 13, 14, 15, 16, 17, 18, 19, 20, or more channels. Increasing the number of channels in the microfluidic device may increase the exit flow rate. Increasing the number of channels in the microfluidic device may increase the throughput of the process. Microfluidic channels may be connected to increase process rate and reduce overall process time. Two or more microfluidic channels may be connected in parallel, in series, or a combination of series and parallel. Channels may be connected by various configurations. For example, multiple channels may be connected with different gap sizes, compressive element spacing, compressive element widths, compressive element angles, channel widths, and channel heights in parallel, in series, a combination of series and parallel, or other configurations. Configurations and feature sizes may be altered for different applications. In an example, configurations and feature sizes may be optimized to enhance the uniformity of imaging agent delivery into heterogeneous cell populations. The throughput of the process may be sufficient to meet certain clinical needs. For example, the throughput of the device may facilitate processing a therapeutic dose of cells for a certain cell therapy application within 15 minutes, at an efficiency greater than or equal to 80%. The method may be used at the point-of-care without causing delays in the workflow of clinicians or surgeons.

The method may comprise using a surfactant. The surfactant may be a chemical comprising a certain formula. The surfactant may be used to prevent cell aggregation or particle aggregation such as nanoparticle aggregation. The surfactant may reduce surface tension between a cell and one or more walls of the microfluidic device. The surfactant may be a fluorinated surfactant.

The microfluidic device may comprise a cell sorting element or a plurality of cell sorting elements. Cell sorting or separation may be performed before and/or after cell processing. For example, cells may be sorted according to biophysical properties prior to labeling. Presorting of cells by biophysical properties may be performed to separate a heterogeneous cell population. For example, a heterogeneous population of cells may be separated to obtain a more uniform plurality of cells. Separation may be performed such that the obtained uniform population of cells has an improved average chance of viability. Alternatively, a heterogeneous population of cells may be separated into multiple subpopulations with common features. One or more population(s) of cells resulted from cell separation may be further labeled with imaging agents. For example, each subpopulation can be processed using the microchannel(s) with properties adjusted to increase delivery in the specific subpopulation.

Cell sorting or separation may be performed after cell processing. For example, after delivering imaging agents to a plurality of cells, the cells with high amounts of delivered magnetic imaging agents may be separated from cells with low amounts of magnetic imaging agents and/or cells with no magnetic imaging agents. Sorting cells after cell processing may be referred to as post-delivery cell sorting. Post-delivery sorting may be performed in a separate microfluidic device. Alternatively, post-delivery may be integrated into the same microfluidic platform. An example procedure may comprise presorting, cell labeling, and/or post-delivery sorting.

In some embodiments, the sorting element of the instant microfluidic devices is therefore a magnetic sorting element. In other embodiments, the sorting element of the microfluidic devices is an optical sorting element.

In some embodiments, the biophysical property is size. In these embodiments, cells of different sizes can sometimes be distinguished and separated within one or more microchannels of a microfluidic device by design choices within the microchannel. In other cases, cells of different sizes can be distinguished and separated by another method, either before or after their passage through the microfluidic device.

In some embodiments, the biophysical property is the presence or absence of a surface antigen. For example, many peripheral blood mononuclear cells can be distinguished and separated by treatment of the cells with one or more antibodies specific for a particular surface antigen and sorting of the treated cells according to the antibodies bound. Those methods often take advantage of optical sorting techniques.

Accordingly, in some embodiments, the methods further comprise the step of sorting a population of cells according to a biophysical property, either before or after the fluid comprising the cells and imaging agent is subjected to flow through the microfluidic device.

The microfluidic device may comprise a droplet generator.

FIG. 1A is a schematic cross-section view of an example cell processing apparatus 100 for intracellular delivery, cell sorting, and/or other operations further described below. In some examples, cell processing apparatus 100 comprises first wall 110 and second wall 112. First wall 110 and second wall 112 may be also referred to as a top wall and a bottom wall, strictly for differentiation and without implying any orientation of cell processing apparatus 100. First wall 110 comprises first interior surface 111. In some examples, first interior surface 111 is planar. However, the interior surface may comprise other shapes. Likewise, second wall 112 comprises second interior surface 113, which may be also planar. In some examples, first interior surface 111 may be parallel to second interior surface 113. First interior surface 111 and second interior surface 113 may extend along the flow direction, identified with arrow 240 in FIG. 1A. First interior surface 111 and second interior surface 113 at least partially define interior 119 of cell processing apparatus 100. More specifically, first interior surface 111 and second interior surface 113 define the interior height (IH), which may impact the linear flowrate within interior 119. Interior 119 may be isolated from the environment and may be used to flow mixture 200, comprising liquid media 210, reagent 220, and cells 230.

In some examples, first wall 110 and/or second wall 112 may be formed from one or more transparent materials. For example, transparent materials of these walls may allow for integration of optical sensors into the cell processing apparatus 100 and/or other types of process control. On the other hand, nontransparent materials for the walls may be used to deliver light-sensitive reagents. Some examples of wall materials may comprise, but not be limited to, polydimethylsiloxane (PDMS), injection molded plastics, silicon, glass, and other polymers.

Referring to FIG. 1A, cell processing apparatus 100 may comprise a plurality of ridges 130, which may extend within interior 119 of cell processing apparatus 100. More specifically, in this example, plurality of ridges 130 may be connected to first wall 110 and extend within from first interior surface 111 and toward second interior surface 113. In some examples, cell processing apparatus 100 may comprises an additional plurality of ridges, which may be connected to the second wall 112 and extend within from second interior surface 113 and toward first interior surface 111. In some cases, the plurality of ridges 130 and the additional plurality of ridges may extend in the opposite direction and, in some examples, they may overlap along the height of the cell processing apparatus 100 (the Z-axis).

FIG. 1A illustrates two ridges forming plurality of ridge 130 extending from first wall 110. However, other numbers of ridges 130 can be used, such as, for example, one ridge, two ridges, three ridges, or four ridges. The number of ridges determines the number of compression cycles that some of cells 230 experience in a single pass through cell processing apparatus 100. Furthermore, additional compression cycles may be achieved by passing cells 230 through cell processing apparatus 100 multiple times. These considerations and the path of cells 230 within cell processing apparatus 100 are further described below.

Each of plurality of ridge 130 may comprises ridge surface 131, forming gap 132 with second interior surface 113. The height (H) of gap 132 may be smaller than the size/diameter (D) of cells 230, which may cause cells 230 to compress as cells 230 pass through gap 132. The compression may also depend on the flowrate and the length of ridge surface 131 (in the X direction), which may be also referred to as a ridge thickness. In some examples, the length of the ridge surface 131 and/or the ridge thickness may be between about 5 micrometers (μm) and 100 micrometers or, between about 20 micrometers and 50 micrometers. The length of the ridge surface 131 may be at least about 1 μm, 2 μm, 3 μm, 4 μm, 5 μm, 6 μm, 7 μm 8 μm, 9 μm, 10 μm, 12 μm, 15 μm, 20 μm, 25 μm, 30 μm, 35 μm, 40 μm, 45 μm, 50 μm, 55 μm, 60 μm, 65 μm, 70 μm, 80 μm, 90 μm, 100 μm, 110 μm, 120 μm, 150 μm, 200 μm, 300 μm, 400 μm, 500 μm, 1 millimeter (mm), or more. In some examples, the length of the ridge surface 131 may be at most about 1 mm, 800 μm, 700 μm, 600 μm, 500 μm, 400 μm, 300 μm, 200 μm, 150 μm, 100 μm, 80 μm, 70 μm, 60 μm, 50 μm, 40 μm, 30 μm, 20 μm, 15 μm, 10 μm, 5 μm, or less.

In some examples, all ridges (or a subset) of the plurality of ridges 130 may have the same length of ridge surface 131 and/or ridge thickness. Alternatively, the length of ridge surface 131 and/or ridge thickness may vary among the ridges. For example, upstream ridges (initial ridges along the flow direction) may have a shorter length of ridge surface 131 than downstream ridges. As such, the compression duration provided by these downstream ridges may be longer than that provided by the upstream ridges. The compression duration may also be impacted by the linear flow rates, which may be controllable by the cross-sectional areas of the cell processing apparatus 100, as further described below.

In some cases, when the length of ridge surface 131 is smaller than the cell size (D), the cell compressions can be compromised due to the cell ability to deform around the ridges, e.g., at least partially remain in uncompressed state when portions of the cell extend outside of gap 132. On the other hand, when the length of ridge surface 131 is much larger than the cell size, such as 10 times or more than the cell diameter, the cells may be prone to accumulation in gaps 132, which can lead to clogging.

Referring to FIG. 1A, in some examples, the cross-sectional profile (in a plane perpendicular to first interior surface 111 and second interior surface 113) of ridge 130 may be rectangular. However, other shapes of the profile are also within the scope, e.g., cylindrical, trapezoidal, or triangular. In some examples, the plurality of compressive surfaces may be orthogonal.

In some examples, ridge surface 131 may be parallel to the second interior surface 113. In other words, gap 132 may be defined by two parallel surfaces, one being ridge surface 131 and another one being a portion of second interior surface 113, and the gap thickness may be constant. Such parallel compressive surfaces may allow for a uniform compression for the entire cell. In some examples, the compression surfaces can be converging and/or diverging. Converging surfaces may allow for increasing the cell compression as the cells pass through the compressive space. Diverging surfaces can be used to allow cell expansion that accelerates cell motion and prevents clogging.

In some examples, the surface roughness of ridge surface 131 may be configured to increase cell membrane poration. For some materials, the surface roughness can be controlled using vapor etching. In some examples, the surface roughness with a mean size of between 10 nanometers (nm) and 1000 nm may be used. In some cases, the surface roughness may have a mean size of at least about 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 20 nm, 50 nm, 100 nm, 300 nm, 500 nm, 800 nm, 1000 nm, 1200 nm, 1300 nm, 1500 nm, or more. In some cases, the surface roughness may have a mean size of less than or equal to about 2000 nm, 1500 nm, 1200 nm, 1000 nm, 800 nm, 600 nm, 500 nm, 400 nm, 300 nm, 200 nm, 100 nm, 50 nm, 20 nm, 10 nm, 5 nm, 1 nm, or less.

In some examples, plurality of ridges 130 may be flexible (e.g., compliant). Flexible ridges may help to reduce cell damage. The ridge flexibility/compliance may be configured by selecting ridge material. In some examples, materials with modulus from 1 to 100 kPa may be used. Furthermore, ridge compliance may be configured using surface coatings with desired elasticity modulus.

Further referring to FIG. 1A, interior 119 may comprise recovery spaces 140, positioned between adjacent pair of plurality of ridge 130 and after the last ridge, along the flow direction/the X direction. In the Z direction, recovery spaces 140 may extend between first wall 110 and second wall 112. The height of recovery spaces 140 (in the Z direction between these walls) may be greater than the gap size. In some examples, the height of the recovery space 140 may be greater than the cell size (D). The height of recovery spaces 140 may be configured to allow the desired cell volume recovery, accompanied by cell expansion in the Z direction. The length of recovery spaces 140 (in the X direction) between two adjacent ridges may be referred to as ridge spacing 145, identified with the letter "S" in FIG. 1A. Ridge spacing 145 may determine the recovery duration, together with the linear flowrate. It has been found that volume gain (Vgain) may increase when the recovery time is increased. The recovery time can be increased by increasing ridge spacing 145. Other considerations for determining ridge spacing 145 may comprise cell characteristics, levels of previous compression, and the like. In some examples, ridge spacing 145 may be between 100 micrometers and 1000 micrometers such as between 200 micrometers and 500 micrometers.

Figure 1B:
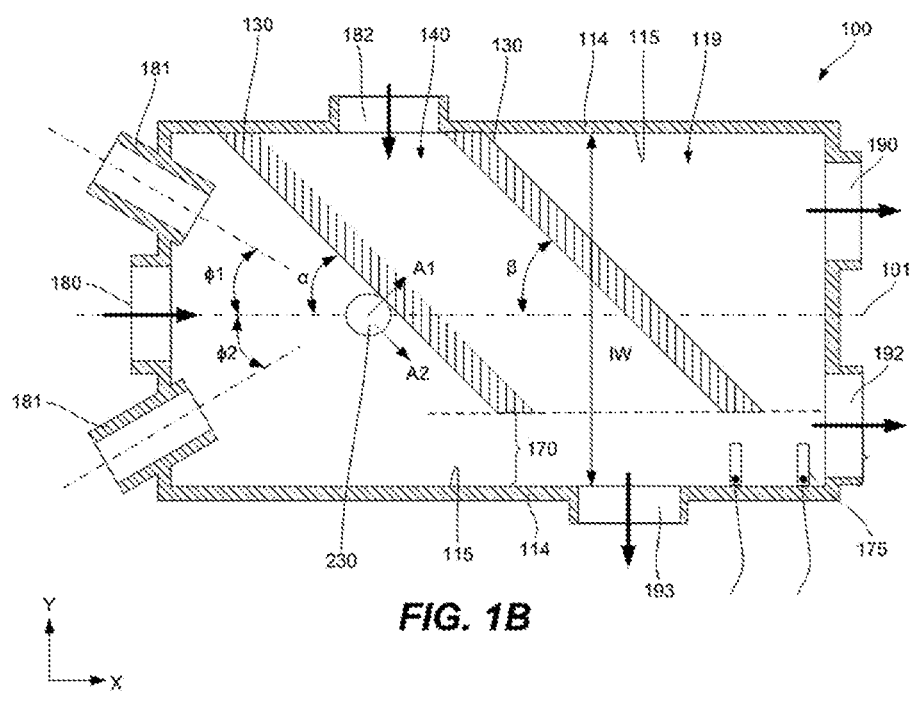
FIG. 1B shows a schematic cross-sectional view of an example microfluidic device of the present disclosure.

Referring to FIG. 1B, cell processing apparatus 100 comprises side walls 114, comprising side interior surfaces 115. Side walls 114 may each be connected to each of first wall 110 and second wall 112, collectively forming interior 119. Side interior surfaces 115 may define the interior width (IW) of cell processing apparatus 100. Together with the interior height (IH), the interior width (IW) may impact the linear flowrate of mixture 200 through interior 119 or, more specifically, through recovery spaces 140. In some examples, the linear flowrate of mixture 200 as it passed through gaps 132 formed by plurality of ridge 130 may be much higher because of a much lower cross-sectional area corresponding to gaps 132 vs. recovery spaces 140 (the volumetric flowrate being the same).

Referring to FIG. 1B, cell processing apparatus 100 may comprise inlet 180 and outlet 190. In some examples, cell processing apparatus 100 may comprises one or more additional inlets 181. For example, multiple inlets may be used for supplying different cells and/or different reagents into cell processing apparatus 100. The inlets may be positioned at various angles relative to the flow direction, which in this example coincides with principal axis 101 of cell processing apparatus 100. For example, inlet 180 is shown to be parallel to the flow direction/principal axis 101. Additional inlets 181 are shown to be not parallel to the flow direction/principal axis 101 (e.g., φ1>0° and φ2>0°. The angle φ1 and/or φ2) may be between 20° and 80° or, more in some examples, between 30° and 60°. In some examples, the angle φ1 and/or φ2) may be greater than or equal to about 5°, 6°, 7°, 8°, 9°, 10°, 12°, 15°, 20°, 25°, 30°, 35°, 40°, 50°, 55°, 60°, 65°, 70°, 75°, 80°, 85°, 90°, or more.

In some examples, inlet 180 may be a self-focusing inlet (e.g. with no sheath focus). The self-focusing inlet may use hydrodynamic focusing, such as Dean's flow effect. For example, inlet 180 may incorporate a focusing section, such as a serpentine channel, focusing ridges, focusing posts, focusing flow splitters, curved geometry using Dean's flow effect, inertial migration effect, and other methods leading to cross-stream cell migration. The focusing section may concentrate cells 230 at desired transverse location within the cell processing apparatus 100. Among other factors, the focusing location depends on the geometry of ridges 130 and ridge surface 131, which may be also referred to as compressive surfaces. For chevron ridges (e.g., shown in FIGS. 1C, 1D, and 2B), the focusing location may be at the middle of the channel, in some examples. For diagonal ridges (e.g., as shown in FIG. 1B), the focusing location may be biased to the side of diversion channel 170. Without a focusing section, a portion of cells 230 may be able flow from inlet 180 right into diversion channel 170, without being compressed by ridges 130, resulting in nonhomogeneous cell processing. In addition to focusing inlets, hydrodynamic flow may be directed by orientation of ridges 130 as further described below. Furthermore, in some examples, the hydrodynamic flow may be directed using electrical fields, such as electroosmotic flow, electrophoretic flow, and the like. Electrical, magnetic, thermal and other fields can be used to concentrate reagents 220 (e.g., macromolecules, nanoparticles) in specific locations within interior 119 of cell processing apparatus 100 to increase intracellular delivery into cells 230 as cells 230 may be compressed by ridges 130. For example, such effects electrophoresis, electroosmosis, thermophoresis, can be used to concentrate reagents near cells. Electrodes producing the fields can be integrated in walls of cell processing apparatus 100 and controlled by an external controller.

In some examples, a single inlet may be used to reduce an amount of reagents 220 that otherwise can be diluted by focusing a sheath fluid. At outlet 190, processed and unprocessed cells can be mixed for collection. An additional sorting device and operation can be used to separate unprocessed cells from mixture 200 after mixture 200 exists cell processing apparatus 100.

In some examples, cell processing apparatus 100 may comprise intermediate inlet 182, e.g., to introduce different reagents and reagent combinations for multistage cell processing. For example, intermediate inlet 182 may be used to introduce an additional mixture into recovery spaces 140 between adjacent ones of plurality of ridges 130. The composition of this additional mixture may be different from mixture 200, introduced upstream through inlet 180, which may be also referred to as a primary inlet.

In some examples, multiple outlets (e.g., outlet 190 and additional outlet 192) may be used for collecting different types of cells 230. As noted above, cell processing apparatus 100 may have cell sorting capabilities such that different types of cells 230 may flow into different portions of cell processing apparatus 100. Referring to FIG. 1B, less compressible cells may be directed by ridges 130 into diversion channel 170, while more compressible cells may pass through gaps created by ridges 130 and may stay away from diversion channel 170. Outlet 190 may be positioned away from diversion channel 170 and may be used for collecting cells 230 that have undergone compressions by ridges 130. Additional outlet 192 may be aligned with diversion channel 170 and may be used for collecting cells 230, which may be directed into diversion channel 170 and have not been compressed by desired number of ridges of plurality of ridges 130. In general, cell sorting characteristics, which determine whether cells 230 are directed into diversion channel 170 or undergo the compression include viscoelasticity, stiffness, or elasticity, and/or adhesion. Overall, multiple outlets may help to avoid clogging. Any number of outlets can be used one, two, three, four, or more.

In some examples, cell processing apparatus 100 may comprise intermediate outlet 193 as, for example, shown in FIG. 1B. For example, intermediate outlet 193 may be fluidically coupled to diversion channel 170 and open to diversion channel 170. Furthermore, intermediate outlet 193 may be disposed between a pair of plurality of ridges 130 as shown in FIG. 1B. Intermediate outlet 193 may be aligned with recovery space 140 between the pair of plurality of ridges 130. Intermediate outlet 193 may be used for collecting unwanted and abnormal cells and cell clusters, e.g., to prevent clogging of diversion channel 170 without passing these cells through the entire cell processing apparatus 100. In some examples, intermediate outlet 193 may be used to collect subpopulations of processed cells to improve delivery efficiency and uniformity. FIG. 1B also illustrates a counter electrode 175 positioned in the diversion channel 170 of the cell processing apparatus 100.

Referring to FIG. 1B, all of plurality of ridges 130 may be diagonally-oriented relative to the general flow direction (shown with an arrow and coinciding with principal axis 101 of cell processing apparatus 100) within cell processing apparatus 100, i.e., from inlet 180 to outlet 190. In some cases, the smallest angle between ridges 130 and principal axis 101 may be an acute angle ($\alpha<90°$. In some examples, the angle may be selected to provide hydrodynamic circulations in gaps 132 under ridges 130 (e.g., between ridge surface 131 and second interior surface 113). The angle of the ridges 130 can also affect the trajectories of cells 230 as, for example, schematically shown by directions A1 and A2 in FIG. 1B. The angle may depend on the flowrate, cell types, and other like parameters. In some examples, the angle may be between 10° to 80° or, more specifically, between 30° and 60°.

In some examples, all of plurality of ridges 130 may have the same angle relative to principal axis 101 (e.g., $\alpha=\beta$, referring to FIG. 1B). In these examples, all ridges extend parallel to each other. Alternatively, some ridges in of plurality of ridges 130 may have different angles relative to principal axis 101 (e.g., $\alpha\neq\beta$) as, for example, is schematically shown in FIG. 1C. For example, a sharper angle may be used closer to inlet 180 ($\alpha<\beta$) for early removal of abnormal cells and cell clusters in a less obstructive manner. A larger angle may be used further down the flow path (downstream) for faster cell compression and improved intracellular delivery. Principal axis 101 may be also referred to as the primary flow axis. It should be noted that while the flow may follow the principal axis 101, localized flow may vary, e.g., uncompressible cells may be diverted by a ridge to diversion channel 170.

Referring to FIG. 1B, in some examples, ridges 130 may be in the form of straight bars, individually arranged in interior 119 of cell processing apparatus 100. In some examples, these straight bars may be arranged or even joined together into a chevron pattern as, for example, is shown in FIGS. 1C and 1D. In this example, each of plurality of ridges may comprise a first ridge portion and a second ridge portion, having different orientations/positioned at different angles relative to the flow direction. It should be noted that the smallest angle between the flow direction and each of the first ridge portion and the second ridge portion may be the same. Alternatively, the smallest angle between the flow direction and each of the first ridge portion and the second ridge portion may be different. Furthermore, this smallest angle may be variable.

In some embodiments, the microfluidic devices of the instant disclosure may comprise multiple microchannels. (See, e.g., FIG. 1C.) Such designs can substantially increase sample throughput. Alternatively or in addition, as shown in FIG. 1D, the width of the microchannels can be increased to increase sample throughput.

In some embodiments, the microchannels of the instant microfluidic devices may not include diversion channels. Although diversion channels can, in some device designs, advantageously provide a pathway for the passage of uncompressible cells (see, e.g., PCT International Application No. PCT/US19/64310, filed on Dec. 3, 2019), omission of diversion channels from a microfluidic device can, in other device designs, be desirable (see, e.g., PCT International Application No. PCT/US20/33298, filed on May 15, 2020). Exemplary microchannel designs lacking diversion channels are shown in FIGS. 1C and 1D. In particular, such designs can enable higher levels of intracellular delivery at higher flow rates for certain types of cells. In addition, such designs can be manufactured using a wider variety of methods and materials than devices comprising microchannels with diversion channels. For example, these designs can be readily prepared using standard methods of injection molding. Accordingly, in some of the instant methods, the channel of the microfluidic device does not comprise a diversion channel.

As was described in PCT International Application No. PCT/US20/33298, filed on May 15, 2020, the use of microfluidic devices having substantially rigid channel walls can result in higher levels of cellular transfection compared to the use of devices having flexible channel walls, particularly at high flow rates. Accordingly, in some of the instant methods, the channel of the microfluidic device is defined by at least a first wall and a second wall, wherein the first wall and the second wall are substantially rigid. In some embodiments, the first wall comprises a flexible material and a bracing material, wherein the bracing material is positioned on an exterior surface of the first wall. The bracing material is preferably a rigid glass or plastic material. In some embodiments, the first wall or the second wall is prepared by injection molding. More specifically, the first wall or the second wall can comprise a glass, a thermoplastic, or a thermosetting polymer.

Figure 2A:
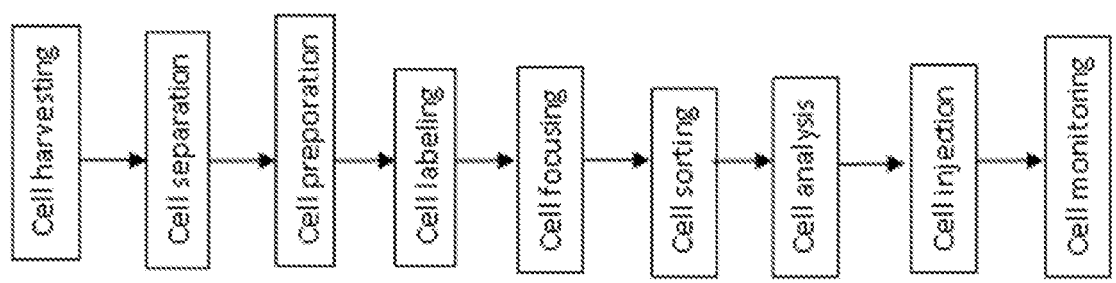
FIG. 2A shows an example workflow that may be used to perform methods of the present disclosure.

FIG. 2A shows an example workflow that may be used to perform the methods of the present disclosure. In an example, a plurality of cells may be harvested. The harvested cells may be separated and sorted based on biophysical properties. A microfluidic device may be used to separate the plurality of cells based on biophysical properties. Labeling may be performed using a microfluidic device comprising a compressive element or a plurality of compressive elements. Cell separation and cell labeling may be performed in two or more separate microfluidic devices. Alternatively, cell separation and cell labeling steps may be integrated into one microfluidic platform. Various microfluidic devices may be sorted and connected in series and/or parallel in various configurations to perform the methods. Alternatively, all stages may be integrated into a single platform using various configurations of the different steps of the procedure. The labeled cells may be collected from the device or devices. The labeled cells may be injected into a subject. The labeled cells may be used to monitor the migration of cells in the subject.

Figure 2B:
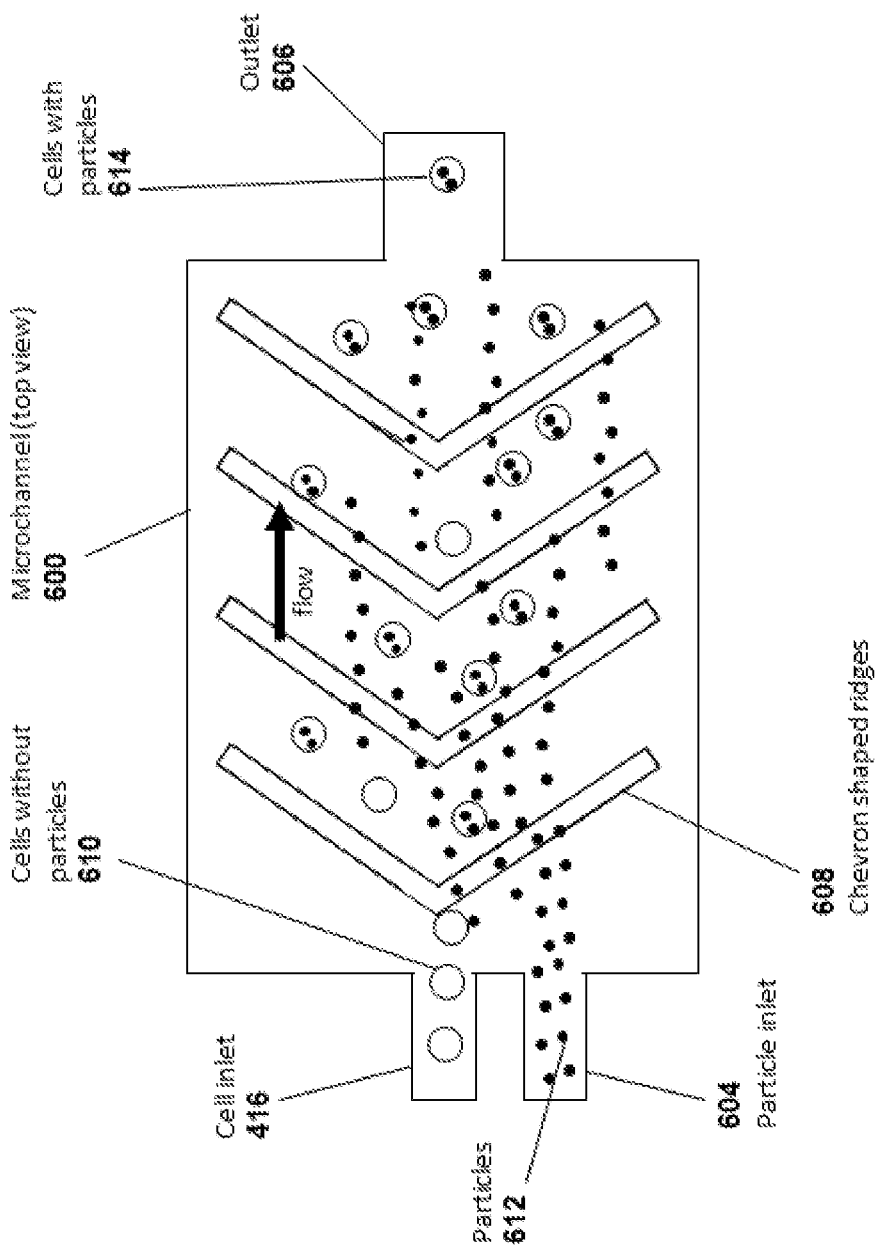
FIG. 2B schematically illustrates another example procedure for cell labeling in a microchannel using compressive elements.

FIG. 2B schematically illustrates another example procedure for cell labeling in a microchannel using compressive elements. Cells may flow through a microchannel 600. The microfluidic device may comprise multiple outlets for cells and outlets for imaging agents (not shown). Device inlets may be used to load cells and payload solutions on the device. In some cases, particles may be mixed with cells within the delivery microchannel to streamline the workflow. The mixing may occur due to secondary flows generated in the microchannel by ridges, such as chevron shaped ridges 608.

Figure 3A:
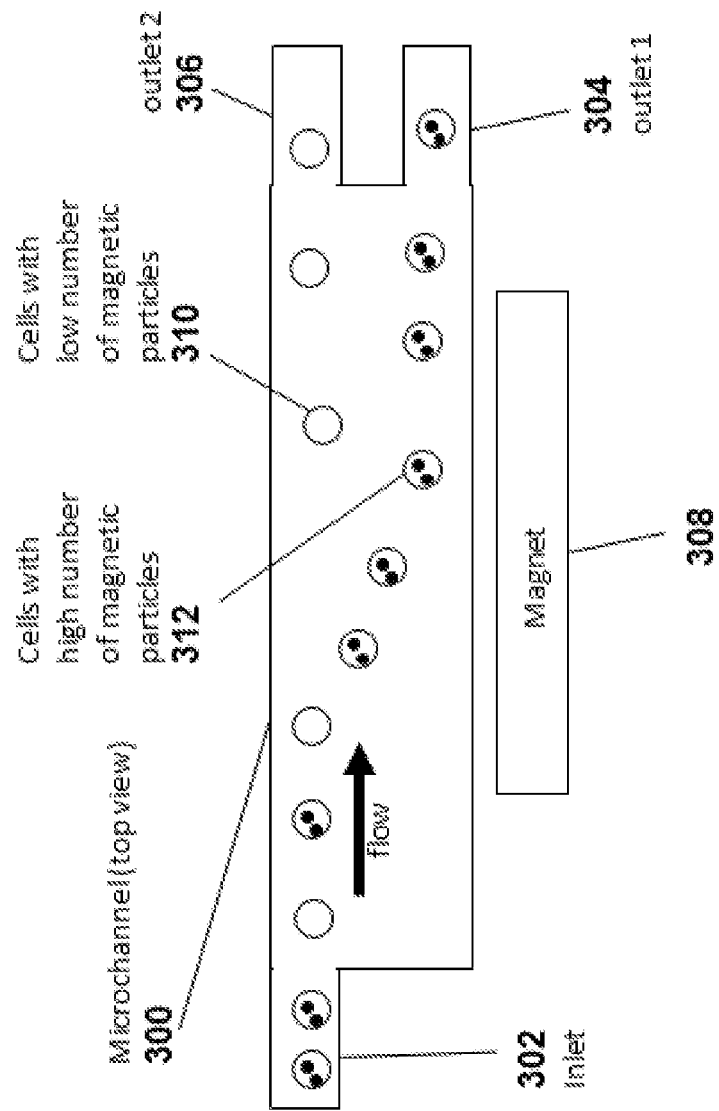
FIG. 3A schematically illustrates an example procedure for magnetic separation of cells after delivery of magnetic particles.

FIG. 3A schematically illustrates an example procedure for magnetic separation of cells after delivery of magnetic particles. Cells may flow through a microfluidic device 300. Device inlet 302 may be used to load cells and payload solutions on the device. A magnetic force may be applied using a magnet 308 (e.g., a permanent magnet or an electromagnet) to the microfluidic device 300 across the direction of cell flow to separate cells containing high amounts of magnetic imaging agents 312 from cells containing no to low amounts of magnetic imaging agents 310. Device may comprise two or more outlets 304 and 306 to separate the cells.

Figure 3B:
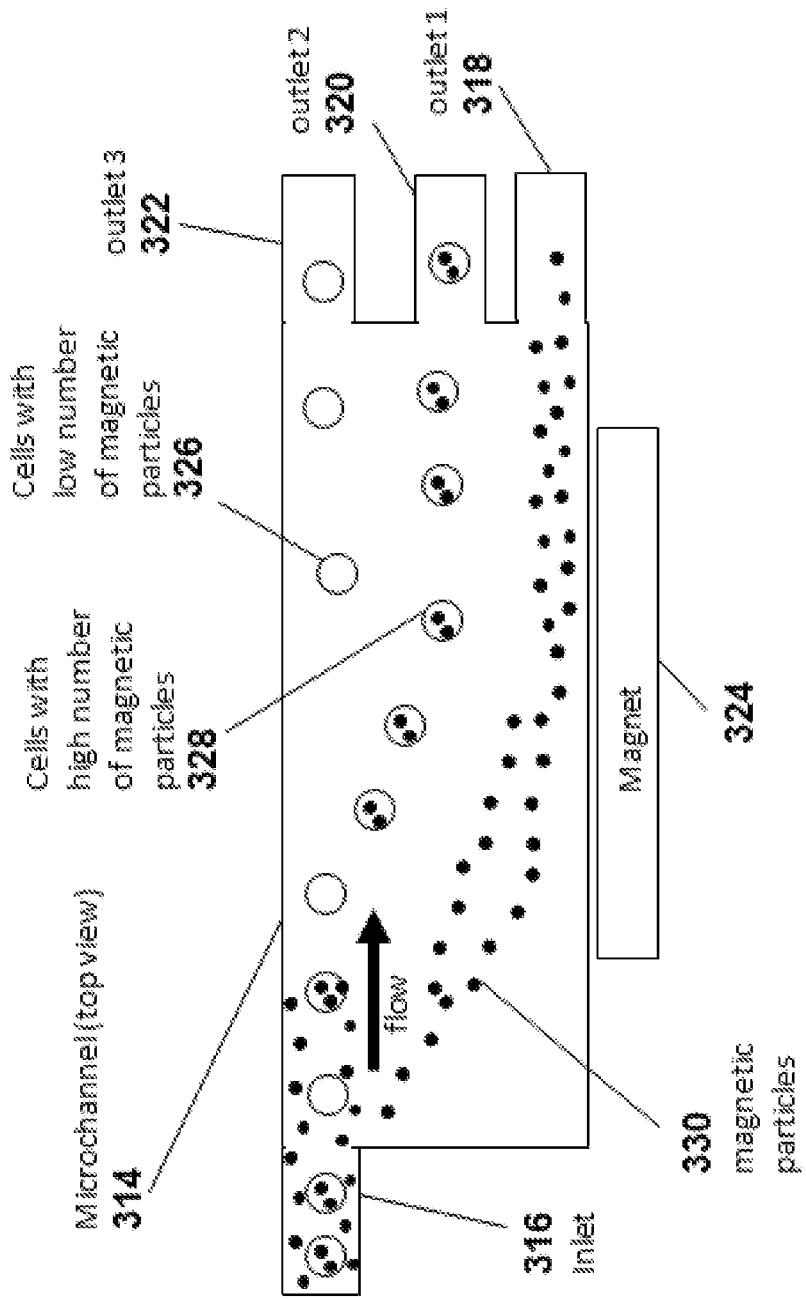
FIG. 3B schematically illustrates another example procedure for magnetic separation of cells after delivery of magnetic particles.

FIG. 3B schematically illustrates an example procedure for magnetic separation of cells after delivery of magnetic particles. Cells may flow through a microchannel 314. Device inlet 316 may be used to load cells and payload solutions on the device. A magnetic force may be applied using a magnet 324 across the direction of cell flow. The magnetic force applied by a magnet 324 may divert cells with magnetic particles 328 toward a dedicated outlet, such as outlet 320 where labeled cells may be collected. Remaining cells may be collected from a different outlet, such as outlet 322. Remaining cells may be reused for additional delivery processing or may be disposed. As shown in FIG. 3B, additional outlets such as outlet 318 may be used to collect magnetic particles 330.

Figure 3C:
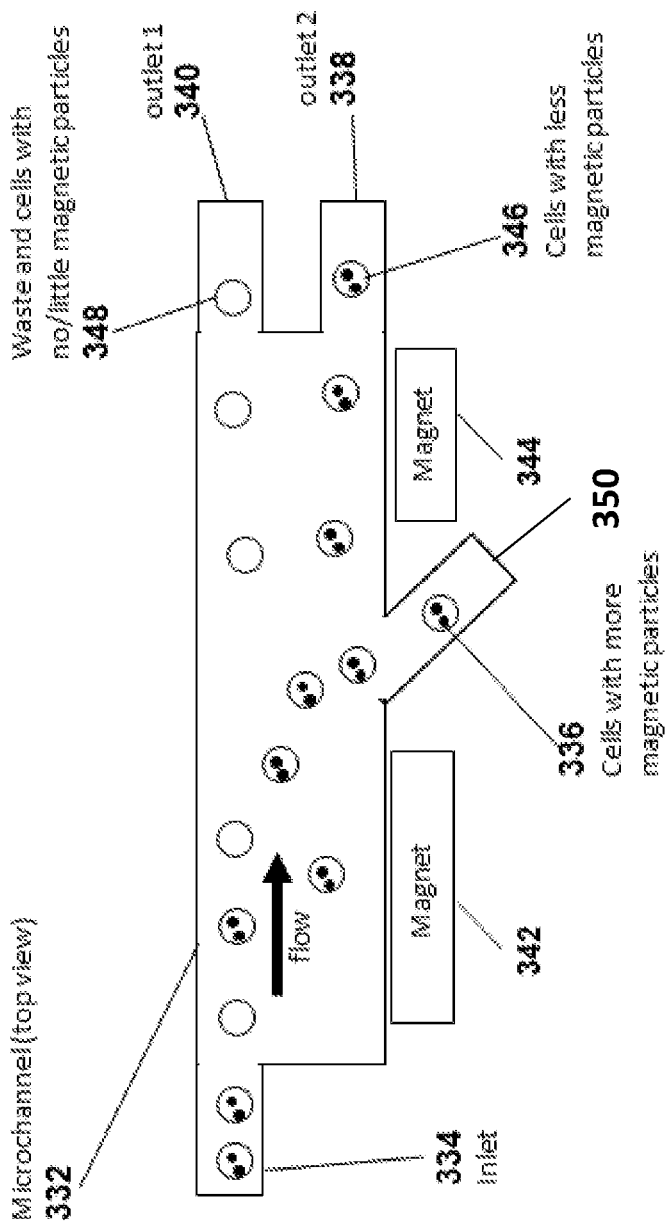
FIG. 3C schematically illustrates another example procedure for magnetic separation of cells after delivery of magnetic particles.

FIG. 3C schematically illustrates another example procedure for magnetic separation of cells after delivery of magnetic particles. As shown in FIG. 3C, multiple sorting stages may be used for collecting cells with different amounts of delivered particles. Cells may flow through a microchannel 332. Device inlet 334 may be used to load cells and payload solutions on the device. A magnetic force may be applied using one or more magnets 342 and 344 at desired directions. The magnetic forces may divert cells with more magnetic particles 336 toward a dedicated outlet, such as outlet 350 where labeled cells may be collected. Another outlet, such as outlet 338 may be used to collect cells with less magnetic particles 346. An additional outlet, such as outlet 340 may be used to collect waste, debris, and cells with no/little magnetic particles 348.

Figure 4:
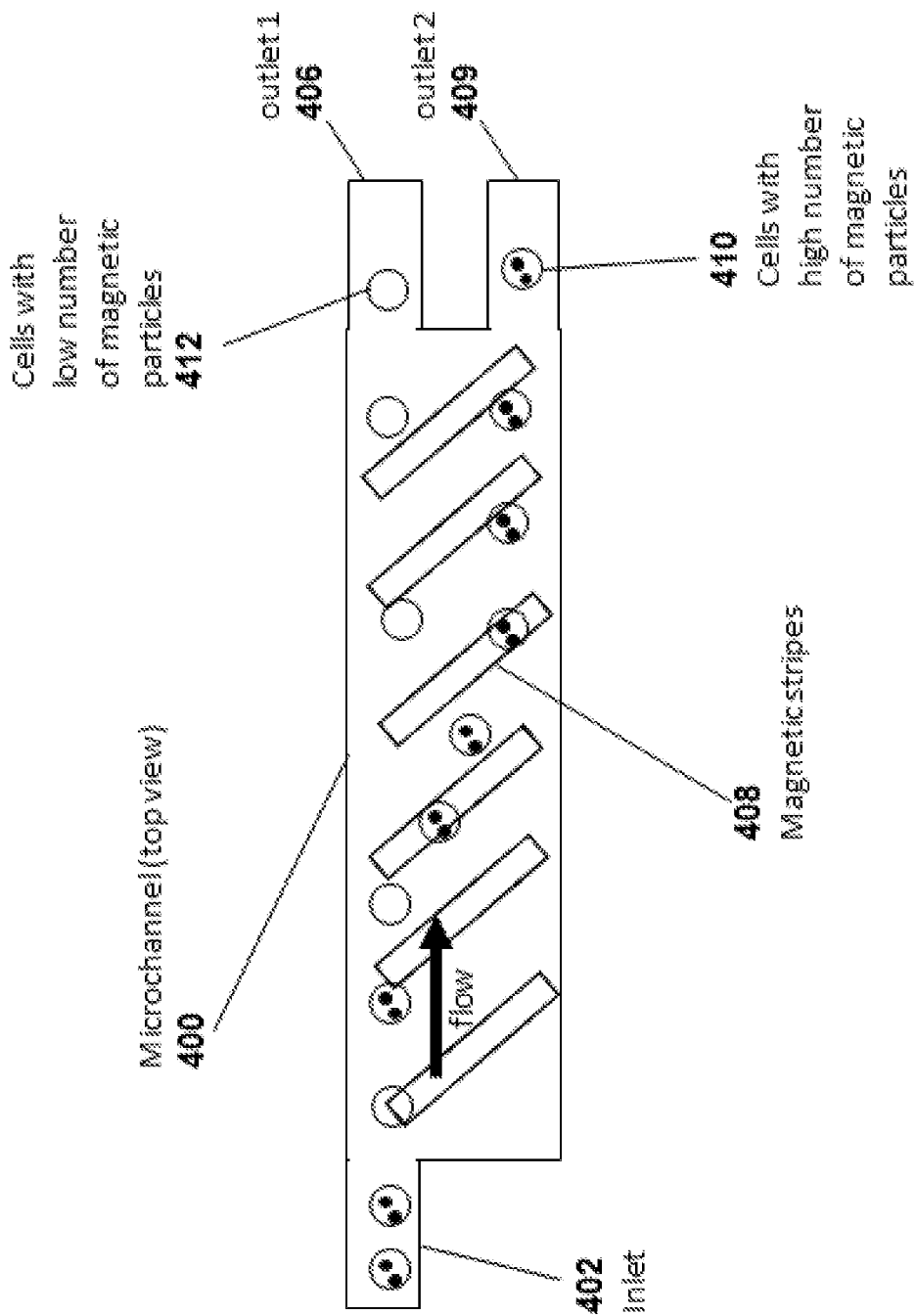
FIG. 4 schematically illustrates another example procedure for magnetic separation of cells after delivery of magnetic particles using diagonal magnetic stripes.

FIG. 4 schematically illustrates another example procedure for magnetic separation of cells after delivery of magnetic particles using diagonal magnetic stripes 408 in a microchannel 400. Cells may flow through a microchannel 400. Device inlet 402 may be used to load cells and payload solutions on the device. Post-delivery sorting may be achieved using diagonal magnetic stripes 408 that may direct cells with magnetic particles or high numbers of magnetic particles 412 toward a channel side such that they may be collected in a separate outlet such as outlet 409 from cells with low delivery of magnetic particles 410 which may be collected from another outlet, such as outlet 406.

Figure 5:
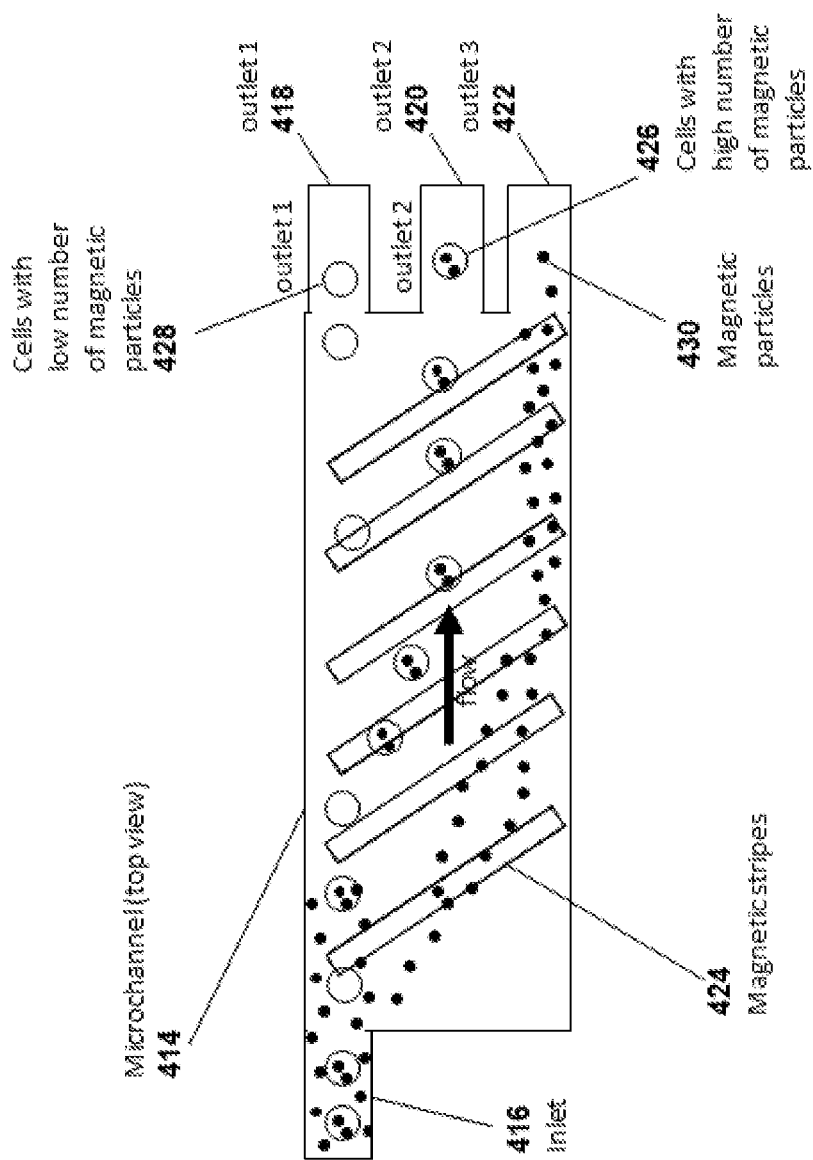
FIG. 5 schematically illustrates another example procedure for magnetic separation of cells after delivery of magnetic particles using diagonal magnetic stripes.

FIG. 5 schematically illustrates another example procedure for magnetic separation of cells after delivery of magnetic particles using diagonal magnetic stripes. Cells may flow through a microchannel 414. Device inlet 416 may be used to load cells and payload solutions on the device. An additional outlet, such as outlet 422 may be used to collect separated magnetic particles 430 dispersed in the fluid carrying cells. Cells with high numbers of magnetic particles 428 and cells with low numbers of magnetic particle 426 may be collected from other outlets such as outlet 420 and outlet 418 respectively.

Figure 6:
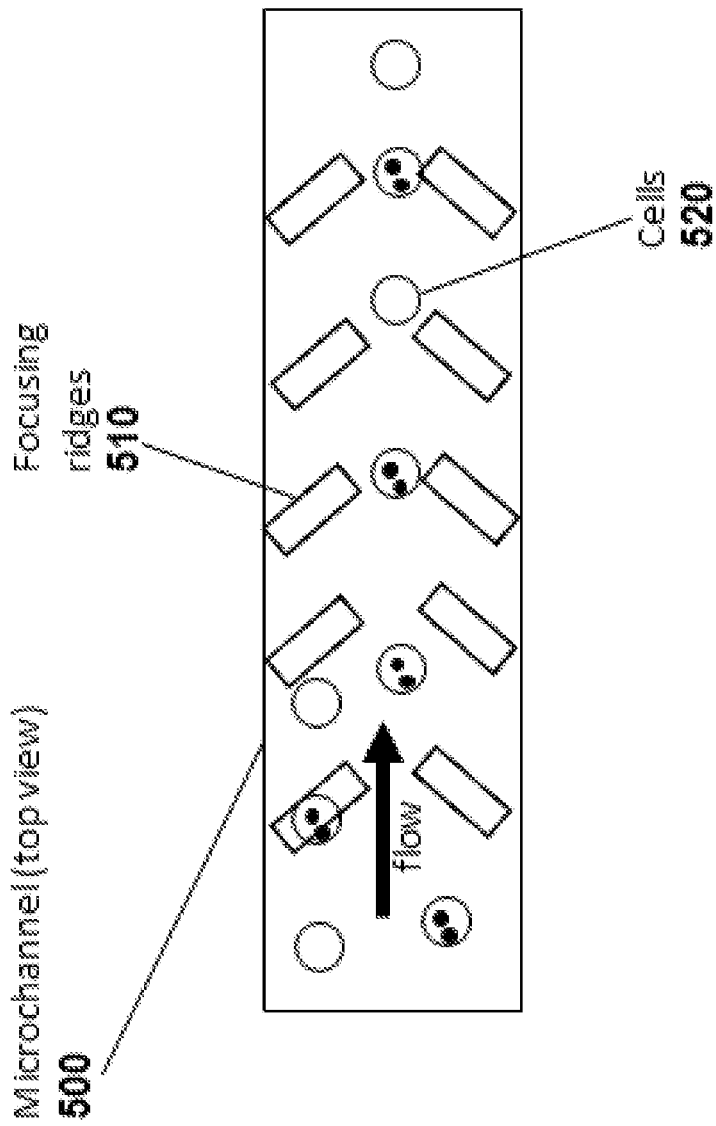
FIG. 6 schematically illustrates another example procedure for focusing cells in a microchannel using focusing ridges.

FIG. 6 schematically illustrates another example procedure for focusing cells in a microchannel using focusing ridges. Post-delivery sorting may be achieved using diagonal ridges such as focusing ridges 510 shown in FIG. 6 with magnetic, metal, or adhesive coatings. Alternatively, post-delivery sorting may be achieved using other types of compressive elements or coating materials. Cell focusing may be performed prior to post-delivery sorting. Focusing may be achieved using inertial migration, dean flow, and diagonal ridges creating secondary circulatory flow causing cells to follow to aggregate in a specific location within the channel flow. For example, as shown in FIG. 6, chevron ridges may be used to focus cells in the center of the microchannel. The methods may be used to deliver labels mostly to cells with specific biophysical and/or other properties, such as cancer cells or other cell subpopulations.

Figure 7:
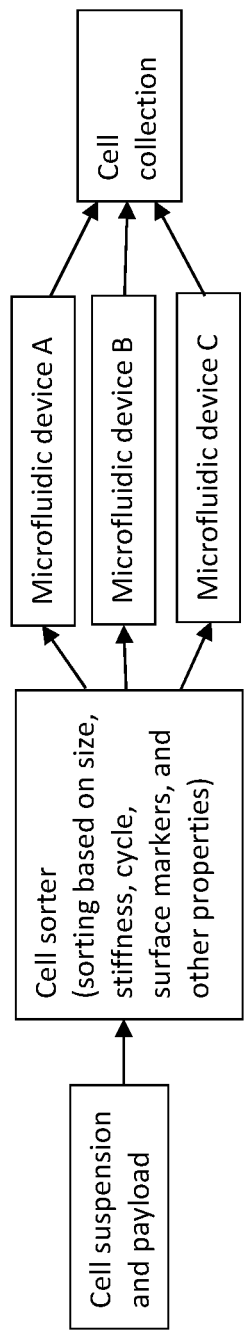
FIG. 7 shows an example workflow that may be used to perform labeling of heterogeneous cell populations.

FIG. 7 shows an example workflow that may be used to perform labeling of heterogeneous cell populations. The procedure may start with preparing cell suspension and payload. A heterogeneous cell population may be homogenized by a presorting mechanism based on cell stiffness, cell size, cell cycle, cell surface marker, and/or other cell properties. After the homogenization, each presorted cell subpopulation may undergo tuned multiple compressions that may deliver imaging agents to the target cell subpopulation. This procedure may have minimal to no negative effects on cell viability. Multiple microfluidic devices may be used to process the cells. Cells may be collected from the plurality of microfluidic devices.

Figure 8:
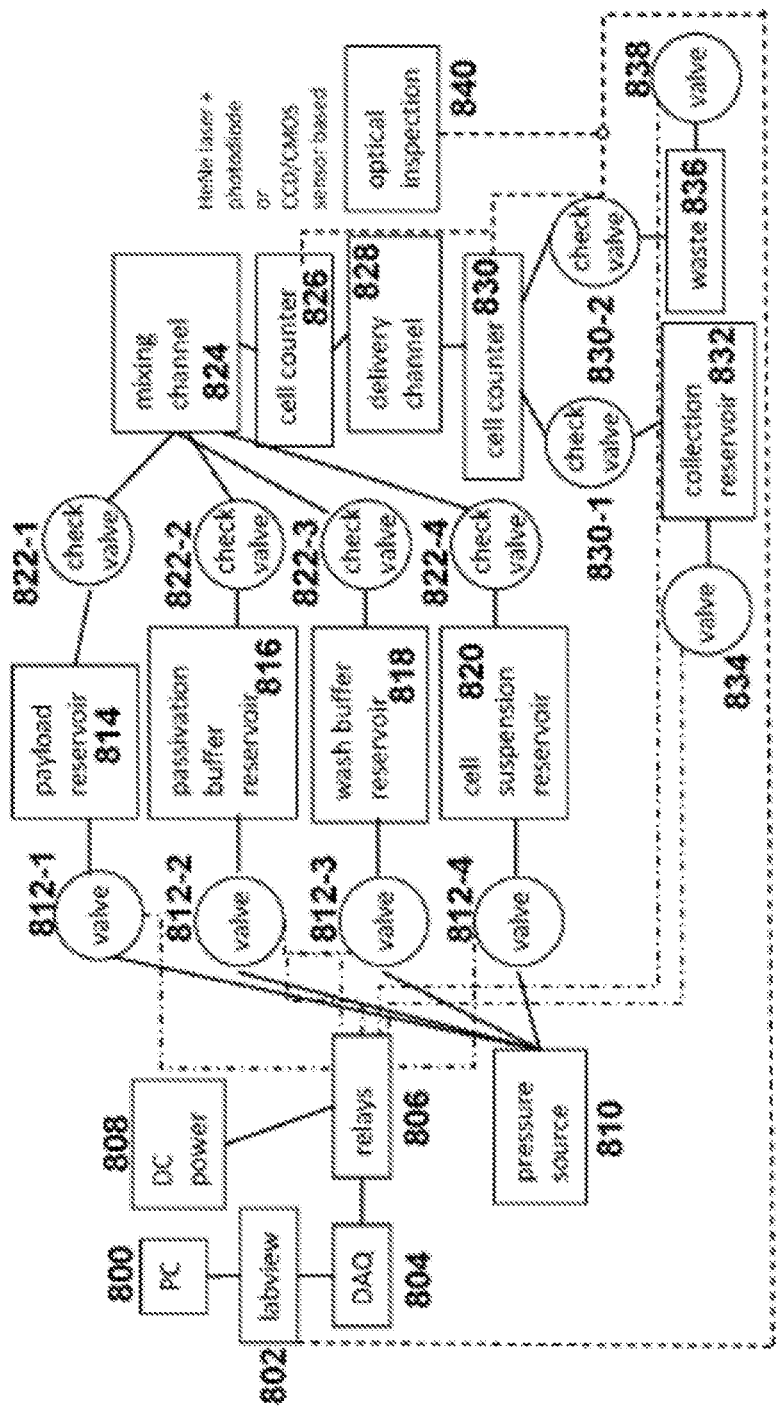
FIG. 8 shows an example flowchart for automation of an example microfluidic device to perform methods of the present disclosure.

FIG. 8 shows an example flowchart for automation of an example microfluidic device to perform the methods of the present disclosure. Multiple solenoid valves 812-1, 812-2, 812-3, 812-4, 822-1, 822-2, 822-3, and 822-4 and designated reservoirs may be used to automate part of or the entirety of the process. Multiple reservoirs may comprise payload reservoir 814, passivation buffer reservoir 816, wash buffer reservoir 818, cell suspension reservoir, and collection reservoir 832. For example, payload solution, passivation buffer, wash buffer, and cell suspension may be placed in separate reservoirs 814, 816, 818, and 820 where pressurized filtered air may be selectively applied by a pressure source 810 using multiple solenoid valves 812-1, 812-2, 812-3, and 812-4. Any unwanted backflow may be prevented by integrated check valves 822-1, 822-2, 822-3, and 822-4. For passivation, the valves 812-2 directly connected to the passivation buffer reservoir 816 and waste chamber 836 may be opened via a computer-programmed system. Delivery channel 828 may be designed with outlets connected to waste chamber 836 and collection reservoir 832. Alternatively, the delivery channel 828 outlets may not be connected to collection and waste chambers to maintain a continuous flow in the delivery channel 828 and avoid dead-zones and stagnation zones Relays 806 may be electronically operated switches. Relays may be connected to a DC power source 808. A computer (PC) 800 may be used to operate and control the system. The computer software used to automate, operate, and control the system may be any computer program or software, such as, LabView 802. A data acquisition (DAQ) system 804 may be used to measure signals and properties and convert them to numerical values that may be used by the computer program (i.e., LabView) 802. The passivation process may be followed by incubation. Next, the valves 812-3 connected to the wash buffer reservoir 818 and waste chamber 836 may be opened to wash off the passivation buffer. All of the other valves may be closed at this stage. For the delivery, the valves connected to the cell suspension reservoir 820, payload reservoir 814, and collection reservoir 832 may be opened. To ensure homogenized cell suspension payload mixture, mixing channel 824 may be integrated between reservoirs 814, 816, 818, and 820 and the delivery channel 828. A cell counter 826 may be incorporated between the mixing channel 824 and delivery channel 828. Another cell counter 830 may be incorporated after the delivery channel 828. The target concentration of payload or cell density may be automatically adjusted by applying appropriate pressure to each reservoir. All of the other valves may be closed at this stage. Additional check valves 830-1 and 830-2 may be incorporated after the cell counter 830. Check valve 830-2 may be connected to a waste chamber 836. Check valve 830-1 may be connected a collection reservoir 832. Additional valves 834 and 838 may be incorporated after the waste chamber 836 and collection reservoir 832. The system shown in FIG. 8 may comprise an optical inspection unit 840. The optical inspection may be performed using laser, such as a HeNe laser and photodiode. Optical inspection may be CCD/CMOS or sensor based. Based upon optical image or transmittance/scattering of diode laser performed by the optical inspection unit 840, the delivery channel 828 may be fully monitored and the delivery process may be automatically halted if there are any unwanted clogging/cell clumps in the delivery channel 828. In such case, the delivery channel 828 may be flushed by fresh wash buffer until there remains no obstacle in the flow path. The entire system in FIG. 8 may be temperature controlled if necessary.

Figure 9A:
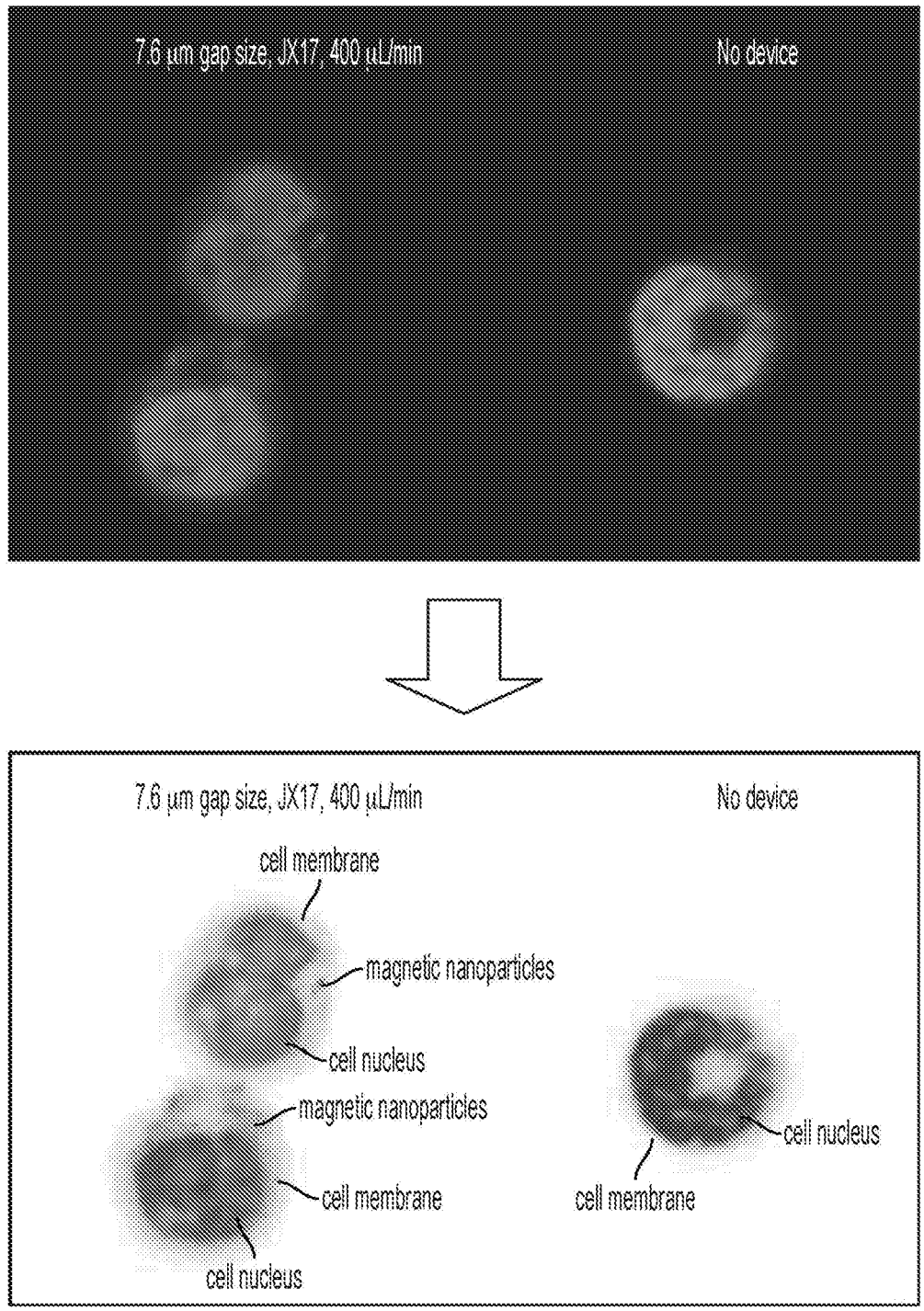
FIG. 9A shows a group of cells transfected with fluorescently labelled magnetic nanoparticles.

FIG. 9A shows a group of cells transfected with fluorescently labelled magnetic nanoparticles. As an example, FIG. 9A shows the result from the microfluidic delivery of nanoparticles. JX-17 Jurkat cells were transfected with fluorescently labelled magnetic nanoparticles by the microfluidic device treatment. The ridge gap size of 7.6 μm for the multiple compression regions was used. Processing flow rate for this experiment and volume were set to be 400 μL/min and 0.5 mL, respectively. Payload concentration was set to be 500 μg/mL. Nuclei were stained by DAPI and pseudo-colored in red. Magnetic nanoparticles with average diameter of 60 nanometers were prelabeled with Alexa 488 dye (green). Transfected cells may be detected/quantified by a confocal microscope, flow cytometry, or magnetic particle imaging (MPI) analysis.

Figure 9B:
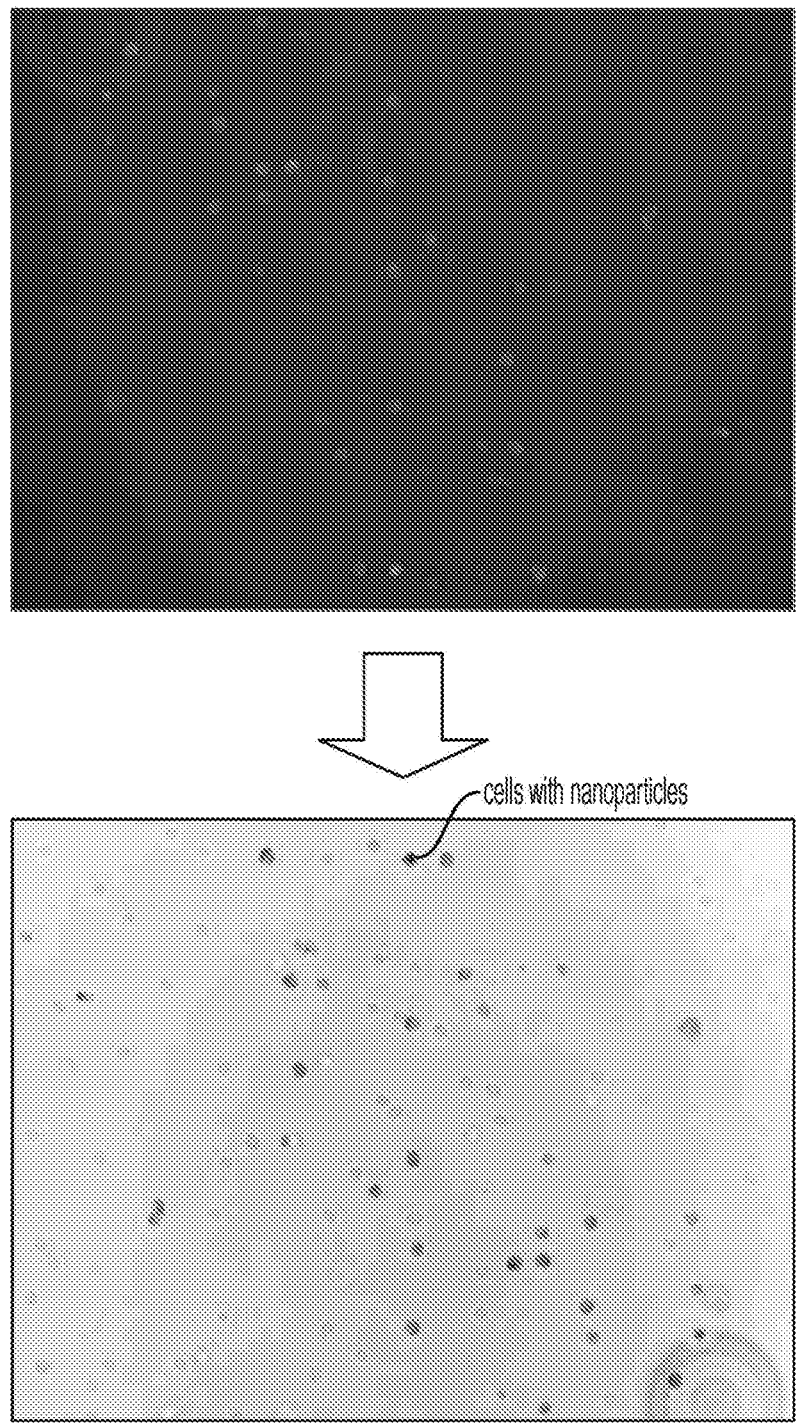
FIG. 9B shows a group of cells transfected with fluorescently labelled magnetic nanoparticles.

FIG. 9B shows a group of cells transfected with fluorescently labelled magnetic nanoparticles. As an example, in FIG. 9B, the fluorescent image shows that about 90% of the device treated JX-17 cells were successfully transfected with fluorescently labelled (Alexa 488; shown in green) magnetic nanoparticles within <2 min for 0.5 mL of cell suspension sample.

Modified Cells

In another aspect, the disclosure provides cells that have been modified according to any of the above-described methods using any of the above-described microfluidic devices or systems. As is understood by those of ordinary skill in the art, cells modified using traditional ex vivo modification methods are often irreversibly changed or damaged as a result of the process. For example, cells transfected using chemical or viral agents typically contain residual chemical or viral components for at least some time after the treatment. In some cases the residual components can remain within the modified cells permanently. In some cases cells modified using traditional ex vivo modification methods display low levels of uptake of extracellular substances. In some cases cells modified using traditional ex vivo modification methods are less viable and are recovered at lower levels than cells modified according to the instant methods using the instant devices and systems.

For example, in the case of electroporation, transfection efficiency and cell viability can be low, thus limiting the yields of modified cells achievable using the method. In addition, off-target variations in gene expression can occur, thus indicating alterations in nuclear and other cellular components that arise as a result of the electroporation process. Electroporated cells can also be slow to recover proliferative capacity, further indicating undesirable alterations in the chemical and biological functions of the modified cells. Finally, electroporation is not suitable for the delivery of substances containing conductive materials, such as the metallic imaging agents and nanoparticles of the instant disclosure.

In contrast, cells obtained using the instant methods and devices suffer fewer modifications or other negative consequences as a result of the process than cells obtained using other traditional intracellular delivery techniques. For example, cells modified using the instant methods or devices recover quickly from the treatments. Without intending to be bound by theory, it is understood that cells can rapidly recover from a compressed state by absorbing surrounding media through one or more transient pores in their cellular membranes. After the cells have expanded and recovered some or all of the volume lost during the compression, the one or more pores are no longer present in the membranes, and the cells rapidly recover the ability to proliferate.

In some embodiments, the instant methods or devices are used to modify a population of cells, and the substance delivered to the cells enters at least 20%, 30%, 40%, 50%, 60%, 70%, 80%, 90%, or even more of the cells in the population.

In some embodiments, the instant methods or devices are used to modify a population of cells, and after the modification, at least 20%, 30%, 40%, 50%, 60%, 70%, 80%, 90%, or even more of the cells in the population are viable.

In some embodiments, the instant methods or devices are used to modify a population of cells, and after the modification, at least 20%, 30%, 40%, 50%, 60%, 70%, 80%, 90%, or even more of the cells in the population are recovered.

In some embodiments, cells modified according to the instant methods or devices are able to proliferate within 10 days of delivery of a substance into the cell. More specifically, the cells are able to proliferate within 8 days, 7 days, 6 days, 5 days, 4 days, 3 days, 2 days, 1 day, or even sooner. In other more specific embodiments, the cells are able to proliferate within 48 hours of delivery of a substance into the cell. More specifically, the cells are able to proliferate within 36 hours, 24 hours, 18 hours, 12 hours, 6 hours, 3 hours, or even sooner.

In some embodiments, a cell modified according to the instant methods or devices is substantially free of a transfection agent. More specifically, the cell is substantially free of a chemical transfection agent or a biological transfection agent.

Exemplary modified cells according to this aspect of the disclosure are described in the Examples below.

Methods of Imaging

In another aspect, the disclosure provides methods of imaging a cell in a subject, wherein the methods comprise the steps of treating the subject with any of the modified cells described herein, in particular modified cells comprising an imaging agent, and identifying the imaging agent within the subject. The method of identifying the imaging agent will depend on the nature of the imaging agent, the modified cell, and the tissue or organ being imaged in the subject. For example, magnetic imaging agents, for example any of the magnetic particles described above, can be imaged using magnetic resonance imaging (MRI) techniques or other suitable magnetic techniques. Optical imaging agents, for example any of the fluorescent agents described herein, including agents with excitation and/or emission maxima in the UV, visible, and/or infrared region of the optical spectrum, can be imaged using any suitable optical techniques, including optical microscopy. Imaging agents comprising one or more positron emitters can be imaged using positron emission tomography (PET). Imaging agents comprising one or more radioisotopes can be imaged using suitable techniques such as single-photon emission computed tomography (SPECT) and the like. Other imaging agents, as described above, can be imaged using X-ray and/or computerized tomography or ultrasound.

Exemplary imaging techniques are described in PCT International Publication Nos. WO 2011/103182 A2, WO 2017/019182 A1, and WO 2020/055455.

Alternative Methods

In another aspect, the disclosure provides methods for transporting at least a subset of a plurality of imaging agents, also referred to herein as contrasting agents, into a plurality of cells, as described in the following numbered paragraphs.

1. A method for transporting at least a subset of a plurality of contrasting agents into a plurality of cells, comprising:
   (a) providing a microfluidic device comprising a microchannel comprising a compressive element;
   (b) directing each of said plurality of cells through said microchannel and in contact with said compressive element, wherein said compressive element facilities formation of pores in cell membranes of said plurality of cells; and
   (c) delivering said at least said subset of said plurality of contrasting agents through said pores and into said plurality of cells, wherein (b)-(c) are performed within a time period of less than or equal to about 1 hour.
2. The method of paragraph 1, wherein upon compression, volumes of said plurality of cells decrease.
3. The method of paragraph 1, wherein said at least said subset of said plurality of contrasting agents are delivered upon expansion of said plurality of cells.
4. The method of paragraph 1, wherein for a cell of said plurality of cells, (b) is performed prior to (c).
5. The method of paragraph 1, wherein said plurality of contrasting agents are imaging agents.
6. The method of paragraph 1, further comprising using said plurality of contrasting agents to image said plurality of cells.
7. The method of paragraph 1, wherein said plurality of contrasting agents comprise particles.
8. The method of paragraph 7, wherein each of said particles has a size that is greater than or equal to about 10 nanometers (nm).
9. The method of paragraph 8, wherein said size is greater than or equal to about 20 nm.
10. The method of paragraph 9, wherein said size is greater than or equal to about 30 nm.
11. The method of paragraph 10, wherein said size is greater than or equal to about 50 nm.
12. The method of paragraph 11, wherein said size is greater than or equal to about 100 nm.
13. The method of paragraph 7, wherein each of said particles has a size that is less than or equal to about 500 nanometers (nm).
14. The method of paragraph 13, wherein said size is less than or equal to about 300 nm.
15. The method of paragraph 14, wherein said size is less than or equal to about 100 nm.
16. The method of paragraph 15, wherein said size is less than or equal to about 50 nm.
17. The method of paragraph 1, wherein at least a subset of said plurality of contrasting agents comprise iron oxide.
18. The method of paragraph 17, wherein at least a subset of said plurality of contrasting agents comprise ferumoxytol iron oxide.
19. The method of paragraph 1, wherein said microfluidic device comprises a plurality of microchannels, which plurality of microchannels comprises said microchannel.
20. The method of paragraph 1, wherein said microchannel comprises a plurality of compressive elements, which plurality of compressive elements comprises said compressive element.
21. The method of paragraph 1, wherein said plurality of cells comprises greater than or equal to about 600 million cells.
22. The method of paragraph 1, wherein said time period is less than or equal to about 30 minutes (min).
23. The method of paragraph 22, said time period is less than or equal to about 15 min.
24. The method of paragraph 1, wherein said at least said subset of contrasting agents are delivered into said plurality of cells at an efficiency that is greater than or equal to about 50%.

Additional exemplary methods and systems for intracellular delivery are provided in PCT International Application Nos. PCT/US19/64310, filed on Dec. 3, 2019, and PCT/US20/33298, filed on May 15, 2020, the disclosures each of which are incorporated herein by reference in their entireties.

It should be understood throughout the disclosure that whenever the term "at least," "greater than," or "greater than or equal to" precedes the first numerical value in a series of two or more numerical values, the term "at least" or "greater than" applies to each one of the numerical values in that series of numerical values.

In addition, it should be understood that whenever the term "no more than," "less than," or "less than or equal to" precedes the first numerical value in a series of two or more numerical values, the term "no more than" or "less than" applies to each one of the numerical values in that series of numerical values.

The term "about" or "nearly" as used herein generally refers to within +/−15%, 10%, 9%, 8%, 7%, 6%, 5%, 4%, 3%, 2%, or 1% of the designated value.

As used herein, the singular forms "a", "an", and "the" include plural references unless the context clearly dictates otherwise.

It will also be readily apparent to one of ordinary skill in the relevant arts that other suitable modifications and adaptations to the methods, systems, and applications described herein can be made without departing from the scope of the invention or any embodiment thereof. Having now described the present invention in detail, the same will be more clearly understood by reference to the following Examples, which are included herewith for purposes of illustration only and are not intended to be limiting of the invention.

EXAMPLES

Example 1. Applications of the Disclosed Methods

The present disclosure provides various non-limiting examples of applications of the methods and systems disclosed herein, including clinical procedures, medical tests, medical imaging, medical scans, research experiments, preclinical, clinical, or non-clinical studies. Non-limiting examples of such applications may further include identifying hypoxic tissue (tissue with low oxygen), visualizing the metabolic activity of tissues, the high-consumption of sugar by tumor cells as compared to the lower consumption by normal surrounding tissues, identifying a plurality of cells as cancer cells, studying tumor response to treatment, new bone formation, assessing changes in both normal bones as well as bone tumors, measuring response to treatments, detecting growth in primary tumors, identifying cells or tissues that may be resistant to radiation or chemotherapy, areas of inflammation, areas of infection, areas of rapid cell division, radiolabeling radiopharmaceuticals, performing heart scans, performing bone scans, examining heart blood flow, assessing heart function, assessing heart function under stress with or without a combination with exercise tests, imaging of the abdomen and pelvis, filling the stomach and intestines to facilitate imaging of the abdomen and pelvis, highlighting blood vessels, highlighting tissues, highlighting organs, and the like.

Additional non-limiting applications of methods and systems of the present disclosure include applications in cell therapy, prediction of therapy success after cell therapy or transplant, tracking the progression over time of the therapeutic cells within a subject. Methods and systems of the present disclosure may provide accurate information about the delivery and retention of therapeutic cells to target areas such as organs of the subject. Methods and systems of the present disclosure may be used to, for example, provide (1) provide cells with safe imaging agents for post-transplant in vivo imaging, (2) plasmid deoxyribonucleic acid (DNA) delivery through nuclear envelope using a nanoparticle plasmid DNA complex, (3) label-free magnetic particle-based cell isolation, (4) nanoparticle-based drug delivery to cells, or (5) nanoparticle-based gene-editing complex delivery.

Methods and systems of the present disclosure may be used for labeling stem cell transplants for knee osteoarthritis or tracking cartilage repair.

Methods and systems of the present disclosure may be used for clinical labeling. For example, methods may be used for subsequent imaging of certain cells within a subject. The methods may facilitate the ability to track cells in vitro or in vivo. For example, the methods may be used to track cells in vivo and assess whether they are engrafting to a potential desired site. Methods may comprise applications in cell therapy or cellular therapy. Methods may comprise a rapid approach to deliver imaging agents into cells. Methods may comprise applications in experimental research. Experimental research may comprise research in relevant fields comprising medicine, translational medicine, biomedical engineering, biological sciences, chemical sciences or engineering, chemical engineering, chemistry, biochemistry, biochemical engineering, biotechnology, biology, pharmacology, enzymology, and more. The method may be used to label hard-to-label cells, such as for example, T cells and/or B cells. The methods may be used for clinical applications at the point-of-care. As an example application, methods may prevent potential delays in the existing workflow of professionals such as researchers, scientists, experimentalists, physicians, clinicians, surgeons, or other users by increasing the throughput of cell labeling compared to conventional labeling methods. The methods may have application in the fields of immunoengineering and regenerative medicine. For example, the methods may be used for T cell therapy homing. For example, the methods may be used for stem cell engraftment. The methods may facilitate high-throughput cell labeling such that the labeling may be performed at an efficiency of higher than 80%, and such that the cells may be labeled uniformly or homogenously.

Labeling stem cell transplants for knee osteoarthritis: Every year, Osteoarthritis may account for 44 million outpatient visits and 700,000 knee-replacement procedures. Early repair of cartilage defects can prevent further deterioration of the joint and the need for an artificial joint prosthesis. Adipose fat derived stem cells (ADSCs) may be used for cartilage-repair. ADSC may be harvested from the patient's own fat depots and implanted into cartilage defects all in one surgery. However, cartilage repair outcomes of ADSC grafts may vary greatly between different patients.

Labeling Adipose fat derived stem cells (ADSCs): An imaging test may be used to track ADSCs in vivo. Iron oxide nanoparticles may be used to label the ADSCs, which may be detected with magnetic resonance imaging (MRI). Labeling of ADSCs may be clinically translatable with the use of the FDA-approved iron oxide nanoparticle, Ferumoxytol for in vivo imaging. In this case the loss of the iron signal in the cartilage at an early time point may correlate with loss of the therapeutic cells and incomplete cartilage repair outcomes. This imaging test may in principle be translatable to the clinic to identify early stem cell treatment failure and identify further confounding factors of treatments. However, there may remain a workflow challenge: in a clinical setting, ADSC harvest and transplantation may occur in one single surgery. This may make it difficult to label ADSC with nanoparticles through classical cell culture techniques in the laboratory. The methods and systems in this disclosure may be used to solve this problem. The microfluidic device may be used to provide rapid compressions of cells that may drive the imaging agents such as nanoparticles into cells for efficient labeling of ADSC with nanoparticles through cell volume exchange for convective transfer (VECT). Microfluidics may be designed, modified, or optimized to label ADSC with ferumoxytol nanoparticles within 15 minutes or less to take place within the surgical workflow. The labeled cells may then be detected longitudinally with MRI and/or magnetic particle imaging (MPI). This approach may lead to clinical translation, accelerate the detection of ADSC grafts which may be at risk for unsuccessful cartilage repair outcomes. This approach may improve morphological and functional reconstitution of arthritic joints, and may be enabling technology that impacts cell therapy success.

Differentiating matrix associated stem cell implants (MASI): A clinically applicable imaging test may be used to differentiate matrix associated stem cell implants (MASI) in patients with favorable and unfavorable outcomes. This imaging test may rely on labeling stem cells with the iron oxide nanoparticle compound ferumoxytol, which may be detected with MR imaging and magnetic particle imaging (MPI), an imaging technology designed for nanoparticle imaging in living subject. In rodent models of arthritis that apoptotic ferumoxytol labeled ADSC showed rapidly declining MR signal due to macrophage clearance. The methods of the present disclosure may be able to load ferumoxtol into ADSCs to enable the imaging test to differentiate successful and unsuccessful stem cell transplants in a pig model.

Example 2. Manufacture and Operation of a Microfluidic Device for the Delivery of Substances to Cells Exemplary microchannel designs for intracellular delivery are described in PCT International Application No. PCT/US19/64310, filed on Dec. 4, 2019, and in references cited therein. Additional microchannel designs are provided in FIGS. 1C and 1D. Microfluidic devices including such microchannel designs can be prepared quickly, simply, inexpensively, and reliably from polydimethylsiloxane (PDMS), which is an organosilicone material capable of solidifying in the presence of a crosslinker and moderate heat. The material enables a high volume of devices to be manufactured for purposes of design optimization and testing.

VECT devices come in a variety of gap sizes. These gap sizes are correlated with a pre-produced silicon wafer. The wafer provides several devices per PDMS manufacturing run and each wafer can be used indefinitely if properly maintained. The resulting devices display certain gap sizes, and each gap size can be used by anyone trained in performing R&D and optimization testing of certain cell types. Those involved in manufacturing PDMS should also have knowledge of maintaining the silicon wafer templates.

Example 3. Delivery of Magnetic Nanoparticles into Jurkat Cells

This example illustrates the efficiency of delivery of magnetic nanoparticles into cultured Jurkat cells, a cell line derived from T lymphocytes. Cells were treated with AFDye488-labeled magnetic nanoparticles at various concentrations and passed through a microfluidic device at two different flow rates. The nanoparticles were dextran CLIO magnetic nanoparticles, functionalized with AFDye488. The nanoparticles contain 1-3 superparamagnetic $Fe_3O_4$ iron oxide cores (8-10 nm in diameter) embedded within the matrix of dextran sugar strands of 40 kDa. The microfluidic device had a design similar to the device shown in FIG. 1A, with a 6.5 μm gap. After passage through the device, cells were subjected to fluorescence-activated cell sorting to identify cells transfected with the labeled particles.

Figure 10:
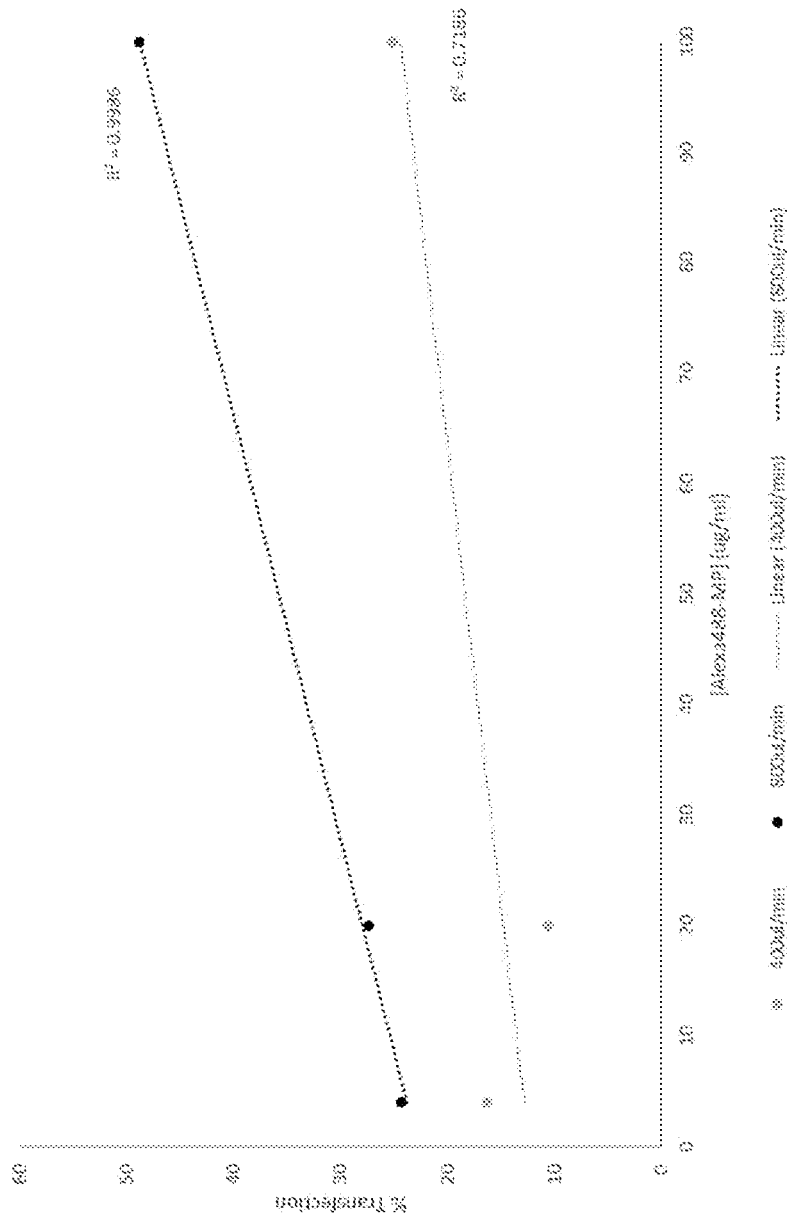
FIG. 10 illustrates the delivery of magnetic nanoparticles into Jurkat cells.

As shown in FIG. 10, high levels of transfection were observed at both flow rates (400 μL/min. (bottom) and 800 μL/min. (top)). The percentage of transfection was observed to increase as the concentration of nanoparticles increased.

Example 4. Delivery of Magnetic Nanoparticles into HSPCs

Microfluidic devices have also been used to deliver magnetic nanoparticles into hematopoietic stem and progenitor cells (HSPCs). Ex vivo modification of such cells (also referred to simply as hematopoietic stem cells (HSCs)) is considered a highly promising route for the treatment of blood diseases such as sickle cell disease, beta thalassemia, adenosine deaminase deficiency severe combined immune deficiency (ADA-SCID), HIV, and others.

Figures 11A, 11B, 11C:
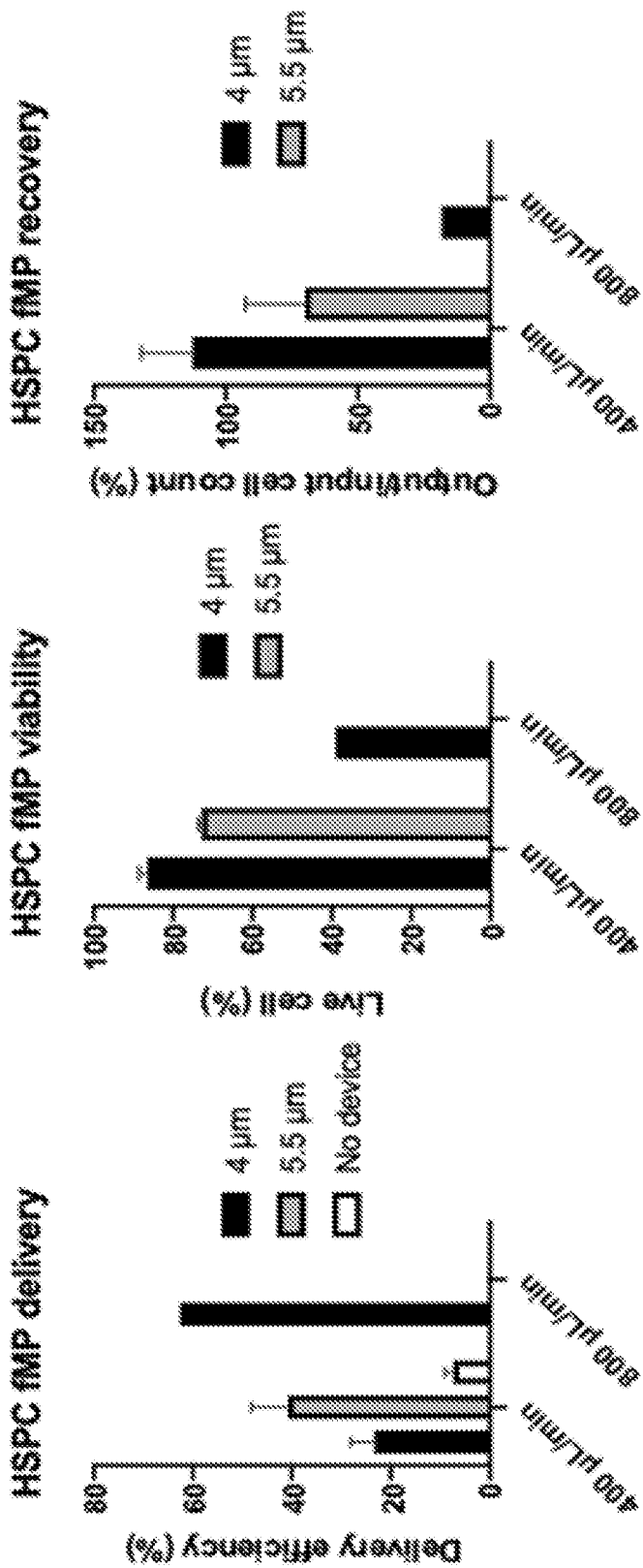
FIGS. 11A-11C illustrate the delivery of magnetic nanoparticles into hematopoietic stem cells.

As shown in FIG. 11A, fluorescently labeled magnetic nanoparticles ("fMP") were delivered at high efficiency to mobilized peripheral blood CD34+ hematopoietic stem and progenitor cells (mPB CD34+ HSPCs) using devices having either 4 μm or 5.5 μm gaps at flow rates of either 400 μL/min. or 800 μL/min. The results were also compared to a no-device control for the 400 μL/min. experiment. CD45+ and CD34+ HSCs were isolated from fresh donor blood (human adult mobilized blood; "Leukopak" from HemaCare) using standard techniques.

As shown in FIGS. 11B and 11C, cells treated using these methods displayed high viability and high recovery, with somewhat better results using the lower flow rate. Cells treated using these methods were found to retain proliferative capacity for at least 48 hours following the treatments. Fluorescent microscopy of the treated cells indicated that the nanoparticles were localized to the cytoplasm.

Example 5. Delivery of Magnetic Nanoparticles into Activated Mouse T Cells

T-cells were isolated from mice and activated. After 24 hours, the activated cells were transfected with fluorescent magnetic nanoparticles using a microfluidic device. As shown in FIGS. 12A-12D, efficiencies of transfection of up to 20% were observed, with high recovery and viability for devices having gaps from 3 μm to 6.5 μm and at flow rates of 200 μL/min. or 400 μL/min.

Example 6. Delivery of Magnetic Nanoparticles into Cells Requires the Device Control experiments were performed where fluorescent magnetic nanoparticles were added to cells at various time points during and after processing of the cells through the microfluidic device. No transfection was observed in cells treated with the magnetic nanoparticles after processing of the cells, thus demonstrating that transfection does not occur by passive diffusion of the magnetic particles into the cells.

Example 7. Delivery of Magnetic Nanoparticles into Human PBMCs

Peripheral blood mononuclear cells (PBMCs) were isolated from healthy human volunteers and activated using commercially available anti-CD3/CD28 reagents. At either 24 hours or 1 week after activation, the cells were transfected with AF647-labeled magnetic nanoparticles at 500 μg/mL, using flow rates of 400 μL/min. or 800 μL/min. and device gaps of 3 μm to 6.5 μm. The nanoparticles were dextran CLIO magnetic nanoparticles, functionalized with AFDye647. The nanoparticles contain 1-3 superparamagnetic $Fe_3O_4$ iron oxide cores (8-10 nm in diameter) embedded within the matrix of dextran sugar strands of 40 kDa.

FIGS. 13A-13C show the results of transfection of cells 24 hours post-activation, and FIGS. 13D-13F show the results of transfection of cells 1 week post-activation. A flow cytometry analysis of cells transfected 1 week post-activation is illustrated in FIGS. 14A-14H. Specifically, FIGS. 14A-14D show an analysis of a negative control, whereas FIGS. 14E-14H show a transfected sample. FIG. 14A identifies lymphocytes according to size (FSC-A) and granularity (SSC-A). FIG. 14B discriminates single events from duplets and cell aggregates by excluding non-linearly correlated events in a FSC-H vs FSC-A plot. FIG. 14C gating serves to select live cells, by staining dead cells with Sytox AADvanced (Y axis, PerCP-Vio700 A channel). After applying this sequential gating, FIG. 14D shows quantification of the amount of fMP delivered by analyzing signal in the APC-A channel. FIGS. 14E-14H represent the same sequential gating in a positively-transfected sample.

Results from the 24-hour and 1-week activation time points are tabulated in Tables 1 and 2, respectively.

TABLE 1

Transfection of PBMCs 24 hours after activation

| Cells | AF647+ (%) | Viable cell count (cells/ml) | Viability (%) |
|---|---|---|---|
| ND | 0.9 | 5.20E+05 | 86.7 |
|  | 7.09 | 4.95E+05 | 83.2 |
| 3 μm, 400 μl/min | 6 | 4.00E+05 | 63.8 |
|  | 9.33 | 3.04E+05 | 61.4 |
| 4 μm, 400 μl/min | 14.6 | 4.37E+05 | 66.1 |
|  | 9.63 | 2.92E+05 | 73.1 |
| 5.5 μm, 400 μl/min | 9.54 | 3.78E+05 | 73.3 |
|  | 5.35 | 4.39E+05 | 74.7 |
| 6.5 μm, 400 μl/min | 10.4 | 5.27E+05 | 73.9 |
|  | 8.97 | 4.74E+05 | 76.0 |
| 5.5 μm, 800 μl/min | 9.99 | 4.14E+05 | 73.4 |
| WT | 0 | (5.52E+05) | 76.7 |

TABLE 2

Transfection of PBMCs 1 week after activation

| Cells | AF647+ (%) | Viable cell count (cells/ml) | Viability (%) |
|---|---|---|---|
| ND | 2.56 | 830000 | 93.3 |
|  | 2.11 | 720000 | 88.3 |
| 3 μm, 400 μl/min | 3.31 | 919000 | 90.6 |
|  | 6.48 | 633000 | 80.9 |
| 4 μm, 400 μl/min | 15.5 | 959000 | 89.3 |
|  | 11.2 | 806000 | 86.5 |
| 5.5 μm, 400 μl/min | 3.82 | 1250000 | 94.1 |
|  | 3.65 | 992000 | 93.8 |
| 6.5 μm, 400 μl/min | 3.73 | 750000 | 91.0 |
|  | 6.23 | 1090000 | 87.9 |
| 5.5 μm, 800 μl/min | 10.7 | 516000 | 76.1 |
| WT | 0.00662 | 1000000 | 92.0 |

Figure 15:
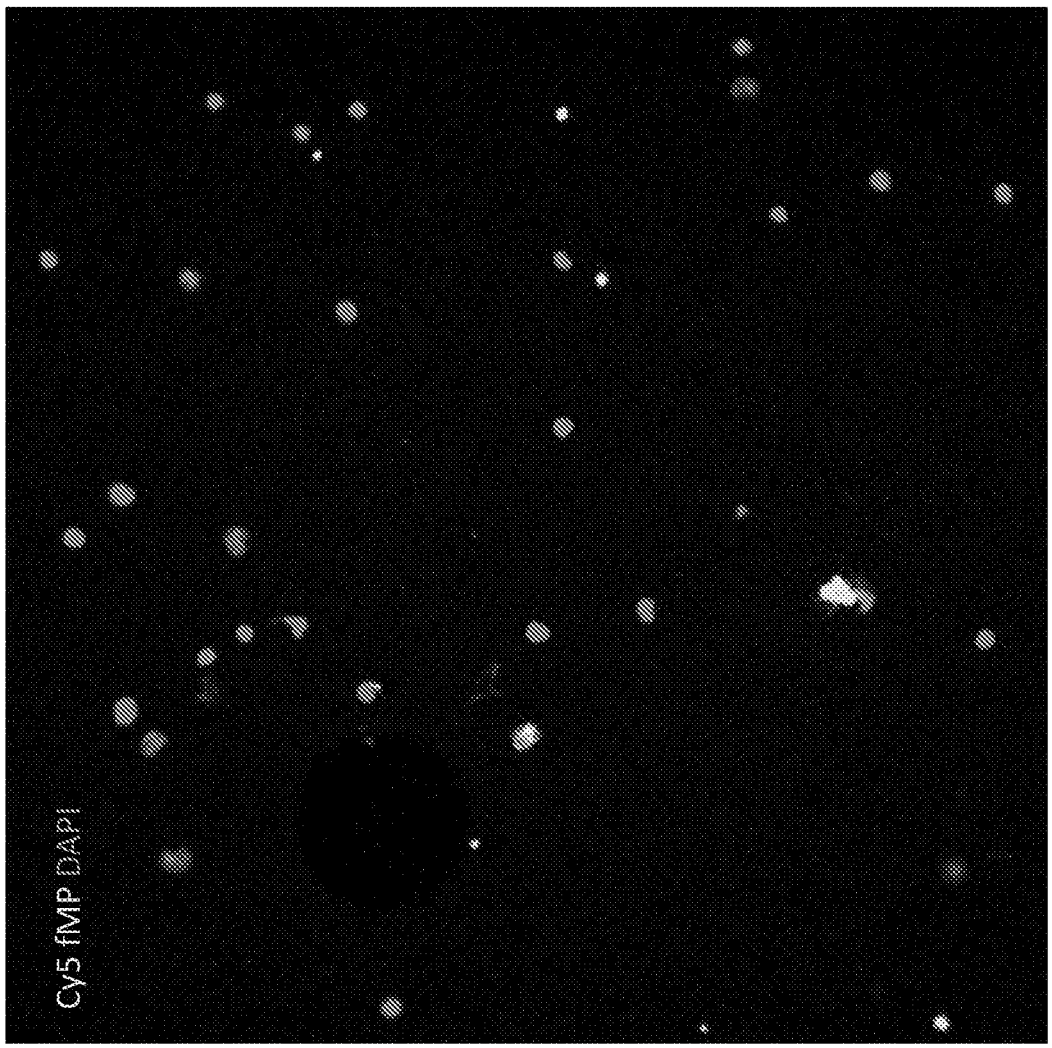
FIG. 15 is a fluorescent micrograph of PBMCs transfected with Cy5-labeled magnetic nanoparticles (green) and costained with DAPI (red).

A fluorescent micrograph of PBMCs transfected with Cy5-labeled magnetic nanoparticles (green) and costained with DAPI (red) is shown in FIG. 15.

Example 8. Delivery of Alternative Nanoparticles into Jurkat Cells

Figure 16B:
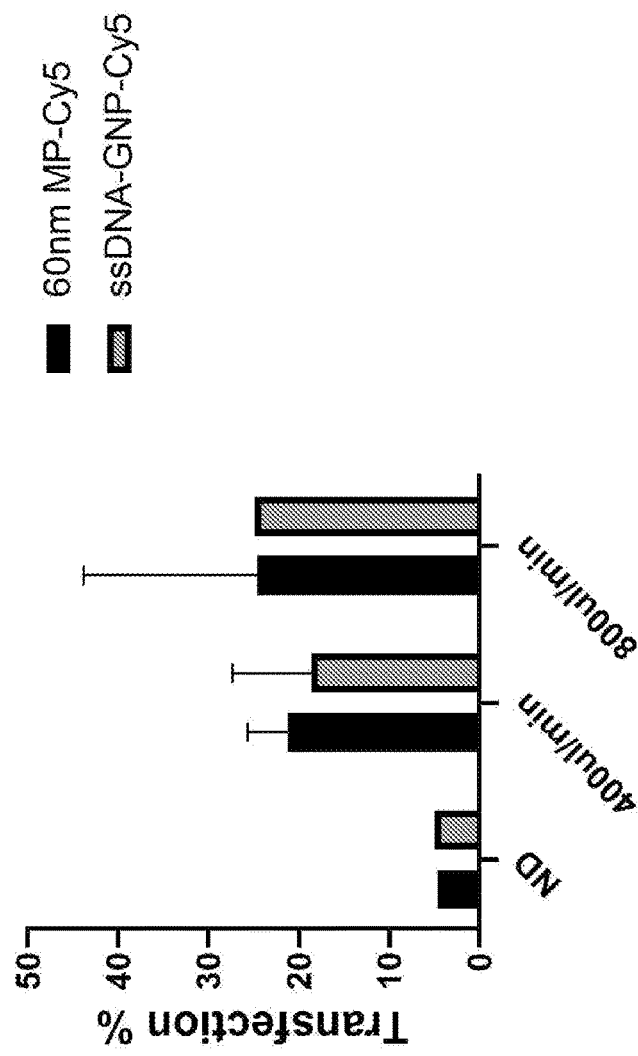
FIGS. 16A and 16B illustrate the delivery of magnetic nanoparticles and gold nanoparticles into Jurkat cells.
Figure 16A:
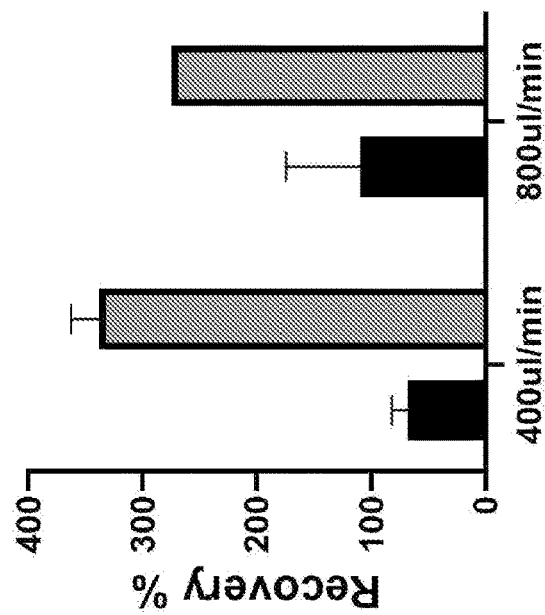

JX17 cells were treated either with 60 nm Cy5-labeled magnetic nanoparticles (60 nm MP-Cy5), 300 nm FITC-labeled Si nanoparticles (not shown), or Cy5-labeled gold nanoparticles further complexed with single-stranded DNA (ssDNA-GNP-Cy5). FIGS. 16A and 16B show the recovery and transfection of the cells at two flow rates using a device having a 6.5 μm gap.

While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined by reference to the appended claims, along with their full scope of equivalents.

What is claimed is:

1. A method for delivering a substance into a cell, comprising:
    (a) providing a microfluidic device, wherein:
        the microfluidic device comprises a channel that comprises a first wall comprising a first interior surface and a second wall comprising a second interior surface,
        the first wall and the second wall extend along a flow direction,
        the microfluidic device comprises a compressive element comprising a plurality of ridges connected to the first wall and extending towards the second interior surface,
        each of the plurality of ridges comprises a ridge surface that forms a gap with the second interior surface,
        each of the plurality of ridges comprises a material having a modulus from 1 to 100 kPa,
        each of the plurality of ridges has a rectangular cross-sectional profile in a plane perpendicular to the first interior surface, and
        the microfluidic device comprises a fluid within the microfluidic device, wherein the fluid comprises the cell and the substance, and wherein the substance is an imaging agent;
    and
    (b) subjecting the fluid to flow through the channel in contact with the compressive element, wherein:
        a height of the gap is smaller than a diameter of the cell, causing the cell to compress as the cell passes through the gap, and
        the contact causes formation of at least one pore in a membrane of the cell, wherein the at least one pore enables an entry of the substance into the cell.

2. The method of claim 1, wherein the cell is an animal cell.

3. The method of claim 1, wherein the gap between the ridge surface and the second interior surface of the channel is between about 2 μm and about 15 μm.

4. The method of claim 1, wherein the cell has a cell diameter, and wherein a gap between the compressive element and an interior surface of the channel is less than or equal to about 20% of the cell diameter.

5. The method of claim 1, wherein each of the plurality of ridges has a width of between 15 μm and 250 μm.

6. The method of claim 1, wherein the fluid flows through the channel at a rate of from about 100 μL/min to about 1,000 μL/min.

7. The method of claim 1, wherein the cell has a volume, and wherein the compressive element is configured to reduce the volume of the cell.

8. The method of claim 1, wherein the channel is defined by at least a first wall and a second wall, wherein the first wall and the second wall are substantially rigid.

9. The method of claim 8, wherein the first wall comprises a flexible material and a bracing material, and wherein the bracing material is positioned on an exterior surface of the first wall.

10. The method of claim 8, wherein the first wall or the second wall is prepared by injection molding.

11. The method of claim 1, wherein the channel does not comprise a diversion channel.

12. The method of claim 11, wherein the channel is defined by at least a first wall and a second wall, wherein the first wall and the second wall are substantially rigid.

13. The method of claim 1, wherein the microfluidic device comprises a sorting element.

14. The method of claim 1, wherein the imaging agent is a nanoparticle.

15. The method of claim 1, wherein the imaging agent is a magnetic imaging agent.

16. The method of claim 1, wherein surface roughness of the ridge surface may be configured to increase cell membrane poration.

17. The method of claim 1, wherein the microfluidic device further comprises a recovery space positioned between an adjacent pair of the plurality of ridges.

18. The method of claim 17, wherein the recovery space extends between the first wall and the second wall and has a height that is greater than the height of the gap.

19. The method of claim 17, wherein the recovery space extends between the first wall and the second wall and has a height that is greater than the diameter.

20. The method of claim 17, wherein the recovery space has a length, measured between the adjacent pair of the plurality of ridges, of between 200 μm and 500 μm.

* * * * *